(12) United States Patent  
Thangarasa et al.

(10) Patent No.: US 12,238,753 B2
(45) Date of Patent: Feb. 25, 2025

(54) METHODS, APPARATUS AND COMPUTER-READABLE MEDIUMS RELATING TO UPLINK TRANSMISSIONS

(71) Applicant: TELEFONAKTIEBOLAGET LM ERICSSON (PUBL), Stockholm (SE)

(72) Inventors: Santhan Thangarasa, Vällingby (SE); Chunhui Zhang, Stockholm (SE); Muhammad Ali Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 17/430,199

(22) PCT Filed: Feb. 14, 2020

(86) PCT No.: PCT/IB2020/051269
§ 371 (c)(1),
(2) Date: Aug. 11, 2021

(87) PCT Pub. No.: WO2020/165860
PCT Pub. Date: Aug. 20, 2020

(65) Prior Publication Data
US 2022/0167371 A1    May 26, 2022

Related U.S. Application Data

(60) Provisional application No. 62/806,263, filed on Feb. 15, 2019.

(51) Int. Cl.
*H04W 72/543* (2023.01)
*H04W 52/02* (2009.01)
*H04W 56/00* (2009.01)

(52) U.S. Cl.
CPC ..... *H04W 72/543* (2023.01); *H04W 52/0216* (2013.01); *H04W 56/001* (2013.01)

(58) Field of Classification Search
CPC ........... H04W 52/0216; H04W 56/001; H04W 72/543; H04W 74/0833; H04W 74/006;
(Continued)

(56) References Cited

U.S. PATENT DOCUMENTS

| | | | | |
|---|---|---|---|---|
| 4,835,372 A | * | 5/1989 | Gombrich | G06F 1/1684 235/462.15 |
| 10,999,885 B1 | * | 5/2021 | Shih | H04W 76/19 |

(Continued)

FOREIGN PATENT DOCUMENTS

| | | |
|---|---|---|
| CN | 107710824 B | 1/2021 |
| JP | 8-32507 | 2/1996 |

(Continued)

OTHER PUBLICATIONS

R1-1813762, Huawei, HiSilicon, Further topics for transmission in preconfigured UL resources [online], 3GPP TSG RAN WG1 #95.

*Primary Examiner* — Jean A Gelin

(57) ABSTRACT

One embodiment provides a method performed by a wireless device. The method comprises: receiving, from a network node, a configuration message comprising an indication of preconfigured radio resources for uplink transmissions; obtaining a synchronization status of the wireless device with respect to the network node; and adapting use of the preconfigured radio resources based on the synchronization status of the wireless device with respect to the network node.

28 Claims, 19 Drawing Sheets

(58) Field of Classification Search
CPC ..... H04W 76/27; H04W 76/19; H04W 76/30; H04W 36/08
USPC .......................................................... 370/311
See application file for complete search history.

(56) References Cited

U.S. PATENT DOCUMENTS

| | | | | |
|---|---|---|---|---|
| 2008/0160989 | A1* | 7/2008 | Favre | H04W 36/36 455/424 |
| 2009/0011718 | A1* | 1/2009 | Chun | H04W 74/0833 455/70 |
| 2010/0080184 | A1* | 4/2010 | Tseng | H04L 1/1854 370/329 |
| 2010/0156710 | A1* | 6/2010 | Wirola | G01S 19/256 342/357.31 |
| 2010/0202436 | A1* | 8/2010 | Albert | H04J 3/0655 370/350 |
| 2011/0243084 | A1* | 10/2011 | Buddhikot | H04W 16/12 370/329 |
| 2012/0113904 | A1* | 5/2012 | Anderson | H04W 76/28 370/329 |
| 2012/0127934 | A1 | 5/2012 | Anderson et al. | |
| 2012/0281566 | A1* | 11/2012 | Pelletier | H04W 76/27 370/252 |
| 2013/0294307 | A1* | 11/2013 | Johansson | H04W 76/28 370/311 |
| 2014/0018085 | A1* | 1/2014 | Young | H04W 76/27 455/450 |
| 2015/0085811 | A1* | 3/2015 | Ohta | H04L 1/18 370/329 |
| 2016/0212721 | A1* | 7/2016 | Sheng | H04W 48/18 |
| 2016/0242052 | A1* | 8/2016 | Kazmi | H04W 84/18 |
| 2017/0290001 | A1 | 10/2017 | Axmon | |
| 2018/0020382 | A1* | 1/2018 | Kim | H04W 48/02 |
| 2019/0074936 | A1* | 3/2019 | Lee | H04L 5/0055 |
| 2019/0150013 | A1* | 5/2019 | Zhang | H04W 24/08 375/224 |
| 2019/0166581 | A1* | 5/2019 | Lien | H04W 72/02 |
| 2020/0260304 | A1* | 8/2020 | Zhou | H04W 76/19 |
| 2021/0176033 | A1* | 6/2021 | Oteri | H04W 74/0816 |
| 2021/0385834 | A1* | 12/2021 | Morozov | H04W 52/0216 |
| 2022/0022247 | A1* | 1/2022 | Agiwal | H04W 72/23 |
| 2022/0109746 | A1* | 4/2022 | Lindheimer | H04W 28/18 |
| 2023/0120065 | A1* | 4/2023 | Kim | H04W 72/1263 370/329 |
| 2023/0171765 | A1* | 6/2023 | Hong | H04W 76/30 370/329 |
| 2023/0189387 | A1* | 6/2023 | Jeon | H04W 72/23 370/242 |

FOREIGN PATENT DOCUMENTS

| | | |
|---|---|---|
| JP | 201056740 A | 3/2010 |
| TW | 201843971 A | 12/2018 |
| WO | 2019/029711 A1 | 2/2019 |

* cited by examiner

METHODS, APPARATUS AND COMPUTER-READABLE MEDIUMS RELATING TO UPLINK TRANSMISSIONS

This application is a 371 of International Application No. PCT/IB2020/051269, filed Feb. 14, 2020, which claims the benefit of U.S. Provisional Application No. 62/806,263, filed Feb. 15, 2019, the disclosures of which are fully incorporated herein by reference.

TECHNICAL FIELD

Embodiments of the disclosure relate to wireless communication networks, and particularly to methods, apparatus and computer-readable mediums relating to uplink transmissions in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been a lot of work in 3GPP lately on specifying technologies to cover Machine-to-Machine (M2M) and/or Internet of Things (IoT) related use cases. Most recent work for 3GPP Releases 13 and 14 includes enhancements to support Machine-Type Communications (MTC) with new UE categories (Cat-M1, Cat-M2), supporting reduced bandwidth of 6 physical resource blocks (PRBs) (up to 24 PRBs for Cat-M2), and Narrowband IoT (NB-IoT) UEs providing a new radio interface (and UE categories, Cat-NB1 and Cat-NB2).

We will refer to the Long Term Evolution (LTE) enhancements introduced in 3GPP Release 13, 14 and 15 for MTC as "eMTC", including (but not limited to) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some important differences include a new physical channel, such as the physical downlink control channels (PDCCH), called MPDCCH in eMTC and narrowband PDCCH (NPDCCH) in NB-IoT, and a new physical random access channel (PRACH), narrowband PRACH (NPRACH) for NB-IoT. Another important difference is the coverage level (also known as coverage enhancement level) that these technologies can support. By applying repetitions to the transmitted signals and channels, both eMTC and NB-IoT allow UE operation down to much lower signal-to-noise ratio (SNR) level compared to LTE, i.e. $Es/Iot \geq -15$ dB being the lowest operating point for eMTC and NB-IoT which can be compared to $-6$ dB Es/IoT for "legacy" LTE.

Transmission Using Preconfigured Uplink Resources

In the Release 16 work item on NB-IoT and eMTC enhancements, a new feature called transmission in preconfigured uplink resources (PUR) in idle and/or connected mode is being introduced. The UE is allocated with PUR resources during radio resource control (RRC) connected state and is also assigned a timing advance (TA) value by the serving cell. The PUR resources can be of different types, namely dedicated, contention-free shared or contention-based shared PUR resource. A PUR resource is defined as a physical channel resource e.g. physical uplink shared channel (PUSCH) resource, i.e. it is a resource allocated in both time- and frequency domain. In the case of NB-IoT, a PUR resource is the same as the NPUSCH resource. For cat-M, it is the same as a PUSCH resource comprising 6 PRBs (e.g. for UE category M1) or 24 resource blocks (e.g. for UE category M2). Analogous to PUSCH and narrowband PUSCH (NPUSCH), the repetitions can also be used for PUR transmissions, which is especially the case when operating under extended coverage.

The UE uses the preconfigured TA value when transmitting using the PUR resources in idle state provided the serving cell does not change. If the serving cell changes then the PUR resources and TA value from the old serving cell become invalid. In addition, the UE can also be configured to check the validity of the TA value based on the changes in the reference signal received power (RSRP) in MTC or narrowband RSRP (NRSRP) in NB-IoT. The UE is allowed to transmit using PUR only if the preconfigured TA value is valid. For example, if the magnitude of the difference between the measured RSRP at the time of transmission using PUR and the measured RSRP when the TA value was configured is below certain threshold, then the UE assumes that the preconfigured TA value is valid. If the TA value is valid then the UE is allowed to use the PUR resources for transmission; otherwise the UE should not carry out transmission using PUR.

Discontinuous Reception (DRX) Cycle Operation

In LTE, DRX cycles are used to enable UEs to save battery. The DRX cycle is used in RRC idle state but it can also be used in RRC connected state. Examples of lengths of DRX cycles currently used in RRC idle state are 320 ms, 640 ms, 1.28 s and 2.56 s. Examples of lengths of DRX cycles currently used in RRC connected state may range from 2 ms to 2.56 s. Extended DRX (eDRX) cycles are expected to be very long e.g. ranging from several seconds to several minutes and even up to one or more hours. Typical values of eDRX cycles may be between 4-10 minutes.

The DRX cycle is configured by the network node and is characterized by the following parameters:

On duration: During the on duration of the DRX cycle, a timer called 'onDurationTimer', which is configured by the network node, is running. This timer specifies the number of consecutive control channel subframes (e.g. PDCCH, ePDCCH subframe(s)) at the beginning of a DRX cycle. It is also interchangeably called the DRX ON period. More specifically it is the duration in downlink subframes that the UE wakes up from DRX to receive a control channel (e.g. PDCCH, ePDCCH). If the UE successfully decodes the control channel during the ON duration then the UE starts a drx-inactivity timer (see below) and stays awake until its expiry. When the onDurationTimer is running the UE is considered to be in DRX state of the DRX cycle.

drx-inactivity timer: This parameter specifies the number of consecutive control channel (e.g. PDCCH, ePDCCH) subframe(s) that the UE should remain in an ON state after the subframe in which a control channel (e.g. PDCCH) indicates an initial uplink (UL) or downlink (DL) user data transmission for this medium access control (MAC) entity. It is also configured by the network node. When the drx-inactivity timer is running the UE is considered to be in non-DRX state i.e. no DRX is used.

Active time: This time is the duration during which the UE monitors the control channel (e.g. PDCCH, ePDCCH). In other words, this is the total duration during which the UE is awake. This includes the "on-duration" of the DRX cycle, the time during which the UE is performing continuous reception while the inactivity timer has not expired and the time the UE is performing continuous reception while waiting for a DL retransmission after one hybrid automatic repeat request (HARQ) round trip time (RTT). The minimum active time is equal to the length of an on duration, and the maximum active time is undefined (infinite).

The DRX ON and DRX OFF durations of the DRX cycle are shown in FIG. 1. The DRX operation with more detailed parameters in LTE is illustrated in FIG. 2.

DRX configuration herein may also be an enhanced or extended DRX (eDRX) configuration. In legacy DRX related procedures the UE can be configured with DRX cycle length of up to 2.56 seconds. But UEs supporting extended DRX (eDRX) can be configured with a DRX cycle at least longer than 2.56 seconds and typically much longer than 2.56 seconds i.e. in order of several seconds to several minutes. The eDRX configuration parameters include an eDRX cycle length, paging window length aka paging time window (PTW) length etc. Within a PTW of the eDRX, the UE is further configured with one or more legacy DRX cycles.

There currently exist certain challenge(s).

Transmission in RRC_IDLE mode using preconfigured uplink resources is realized by the UE obtaining a timing advance (TA) command while in the RRC_CONNECTED state and later using that TA in RRC_IDLE state for adjusting the timing for the uplink transmission. However, uplink transmissions using PUR in RRC_IDLE state may not take place immediately and can occur later in time. Consequently, the received TA may no longer be valid, for example due to UE mobility, change of surrounding environment, UE timing drift etc. This means that the preconfigured uplink resources already allocated for transmissions in RRC_IDLE state are wasted.

SUMMARY

Certain aspects of the present disclosure and their embodiments may provide solutions to these or other challenges.

The disclosure provides several embodiments for the wireless device and network node.

A first embodiment is related to a wireless device (e.g. UE), and may be summarized as UE determining its receiver/transmitter synchronization information wrt the serving cell (cell1), obtaining PUR configuration and using that information for adapting the PUR transmission scheme. Activity related synchronization information can be explicit or implicit information indicating the frequency- and/or timing drift of the UE wrt cell1. This information can be based on historical statistics, pre-defined information, or received configuration from a network node. The synchronization status of the UE can be determined based on the UE activity level in cell1 e.g. UE receiver and/or UE transmitter activities. An example of the UE activity related information comprises one or more of a DRX cycle configuration, (e.g. DRX cycle length, whether normal DRX or eDRX is configured, PTW window etc), UE discontinuous transmission (DTX) cycle etc. The frequency and/or timing drift can be linked to the DRX configuration.

As shown in FIG. 3, the UE can maintain the synchronization accuracy to an acceptable level for a certain duration (period T1 in FIG. 3) after active period (e.g. DRX ON duration) when it is configured with a certain DRX cycle. Thereafter (e.g. during period T2 in FIG. 3) the synchronization accuracy can become too poor to carry out reliable transmissions. Adapting of PUR transmission scheme herein comprises the UE suspending, delaying or releasing the intended PUR transmission so that they don't occur during the period when synchronization accuracy is poor. For example, the UE may suspend or delay the PUR transmission if it is occurring in a period where UE is expected to be out of synchronization. The values of parameters T1 and T2, which can be pre-defined, may further depend on DRX cycle configuration used by the UE in cell1 e.g. one or more of eDRX cycle, PTW duration, DRX cycle length within PTW etc. For example if PTW is larger than certain PTW threshold then T1 is larger than certain activity time threshold (Ta); otherwise T1 is less than or equal to Ta.

One aspect of the disclosure according to this embodiment provides a method performed by a wireless device. The method comprises receiving, from a network node, a configuration message comprising an indication of preconfigured radio resources for uplink transmissions; obtaining a synchronization status of the wireless device with respect to the network node; and adapting use of the preconfigured radio resources based on the synchronization status of the wireless device with respect to the network node.

A second embodiment is also related to a wireless device (e.g., UE), wherein the UE adapts a PUR resource requesting procedure based on the determined information on synchronization information, which in turn can be determined based on the UE activity level as explained above e.g. DRX cycle, eDRX cycle, PTW duration etc. Adapting the PUR resource request procedure comprises whether or not the UE is going to utilize PUR resources for transmission in a period of time, T2 in FIG. 3. For example, if the determined synchronization information indicates that the UE is going to be out of synchronization during T2 wrt cell1, then it refrains from requesting or utilizing any PUR resources for transmission in cell1. Otherwise (if UE maintains synchronization during T2) then it may request PUR resources on the condition that T2 is not barred from network side.

One aspect of the disclosure according to this embodiment provides a method performed by a wireless device. The method comprises obtaining a synchronization status of the wireless device with respect to a network node; and, based on the synchronization status, adapting a procedure for requesting preconfigured radio resources from the network node for uplink transmission.

A third embodiment is also related to a wireless device (e.g., UE), wherein the UE may report its capability on the synchronization lead time to the network before the PUR transmission when it lost the synchronization to the network or when its synchronization accuracy to the network is poor. The network will use this information to configure or confine the UE PUR transmission occurrence depending the network primary and secondary synchronization signal (PSS and SSS) channel presence. For example, if the bandwidth-reduced, low-complexity (BL) UE is in CE ModeB and needs a long lead time to resynchronize to the network once it has lost synchronicity to the network, the network may not configure the PUR resource to the UE, or it may only allow PUR transmission within DRX window, or the PUR transmission window may need to take account of the lead time so that the UE can synchronize to the network before any reliable PUR transmission.

One aspect of the disclosure according to this embodiment provides a method performed by a wireless device. The method comprises obtaining an amount of time required to synchronize with a network node; and reporting the amount of time to the network node, enabling the network node to adapt its scheduling of preconfigured radio resources for the wireless device for uplink transmissions.

A fourth embodiment is related to a network node (e.g. eNodeB), which receives a request from the UE for PUR transmission resources in cell1. The network node further determines the synchronization state of the UE for the intended PUR transmission. The network node can determine the synchronization status of the UE based on the UE activity level wrt cell1 e.g. DRX cycle, eDRX cycle, frequency of scheduling signals to the UE in UL and/or in DL etc. Based on the determined state, the network node configures the UE with PUR transmission resources. In one example, network node configures the UE with PUR transmission resource in response to determining that the synchronization (e.g. the time- and frequency synchronization) is going to be maintained wrt cell1. In a second example, the network node may reject the received request from the UE for PUR transmission resource if it is determined that the UE is expected to be out of synchronization wrt cell1 over the requested transmission period.

One aspect of the disclosure according to this embodiment provides a method performed by a base station. The method comprises: responsive to receipt of a request from a wireless device for preconfigured radio resources for uplink transmissions, obtaining a synchronization status of the wireless device with respect to the base station; based on the synchronization status, adapting preconfigured radio resources for the wireless device for uplink transmissions; and causing transmission of a configuration message to the wireless device, the configuration message comprising an indication of the adapted preconfigured radio resources for the wireless device for uplink transmissions.

A fifth embodiment also relates to a network node (e.g., eNodeB), where the network node re-allocates the PUR resources based on the determined synchronization information. For example, if the determined synchronization information indicates that PUR transmissions are likely to fail (e.g. not received at the BS in cell1) for the said UE due to poor synchronization wrt cell1, then the network node allocates those resources to other UEs which are expected to be better synchronized wrt cell1 during the transmission period.

One aspect of the disclosure according to this embodiment provides a method performed by a base station. The method comprises: causing transmission of a configuration message to a first wireless device, the configuration message comprising an indication of preconfigured radio resources for the first wireless device for uplink transmissions; obtaining a synchronization status of the first wireless device with respect to the base station; and, based on the synchronization status, re-allocating the preconfigured radio resources to a second wireless device.

A sixth embodiment also relates to a network node (e.g., eNodeB), in which the network node uses UE-reported lead time to synchronize to the network to configure or confine the UE PUR transmission occurrence depending on the network PSSS/SSS channel presence.

One aspect of the disclosure according to this embodiment provides a method performed by a base station. The method comprises: responsive to receipt, from a wireless device, of a report message comprising an indication of an amount of time taken for the wireless device to synchronize with the base station, adapting preconfigured radio resources for the wireless device for uplink transmissions based on the indicated amount of time; and causing transmission of a configuration message to the wireless device, the configuration message comprising an indication of the adapted preconfigured radio resources for the wireless device for uplink transmissions to the base station.

The embodiments below are described in the context of a UE using PUR in RRC_IDLE state. But they are applicable for UE operation in any low activity state of the UE. Examples of low activity states are RRC_IDLE, RRC_INACTIVE, any state where the UE context is known to one or more cells in a group of cells etc.

Certain embodiments may provide one or more of the following technical advantage(s). PUR transmission resources are allocated to the UE only when transmissions are expected be successful. PUR transmission resources are better utilized by not using resources which are already allocated when transmissions are likely to fail. The PUR transmission resources may be allocated to other UEs instead. Network resources are efficiently used. Interference is reduced in the network.

DETAILED DESCRIPTION

Figure 1:
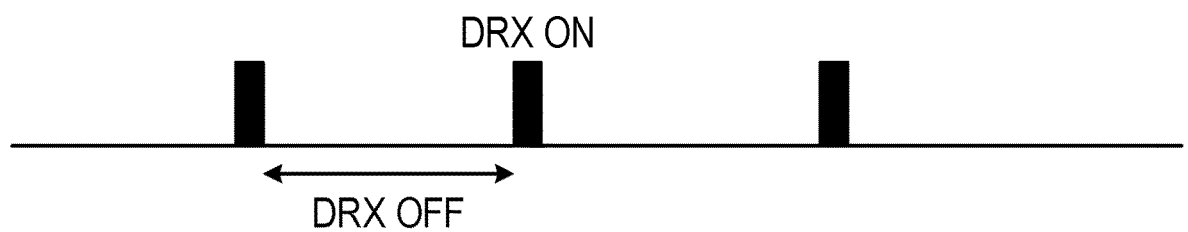
FIG. 1 shows DRX ON and OFF periods.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

In some embodiments a more general term "network node" is used and it can correspond to any type of radio network node or any network node, which communicates with a UE and/or with another network node. Examples of network nodes are NodeB, MeNB, SeNB, a network node belonging to a master cell group (MCG) or secondary cell group (SCG), base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, remote radio units (RRU), remote radio heads (RRH), nodes in distributed antenna system (DAS), core network node (e.g. mobile switching centre (MSC), mobility management entity (MME), etc), operations and maintenance (O&M), operations support system (OSS), self-organizing networks (SON), positioning node (e.g. evolved serving mobile location centre (E-SMLC)), Minimization of Drive Tests (MDT) test equipment (physical node or software), etc.

In some embodiments the non-limiting term user equipment (UE) or wireless device is used, and it refers to any type of wireless device communicating with a network node and/or with another UE in a cellular or mobile communication system. Examples of UE are target device, device to device (D2D) UE, machine type UE or UE capable of machine to machine (M2M) communication, personal digital assistant (PDA), personal access device (PAD), Tablet, mobile terminals, smart phone, laptop embedded equipped (LEE), laptop mounted equipment (LME), USB dongles, proximity services (ProSe) UE, vehicle-to-vehicle (V2V) UE, vehicle-to-X (V2X) UE, etc.

The embodiments are described for LTE e.g. MTC and NB-IoT. However, the embodiments are applicable to any RAT or multi-RAT systems, where the UE receives and/or transmit signals (e.g. data) e.g. LTE frequency division duplex (FDD)/time division duplex (TDD), wideband code-division multiple access (WCDMA)/high-speed packet access (HSPA), global system for mobile communications (GSM)/GSM EDGE radio access network (GERAN), Wi Fi, WLAN, CDMA2000, 5G, new radio (NR), etc.

The term "time resource" used herein may correspond to any type of physical resource or radio resource expressed in terms of length of time. Examples of time resources are: symbol, mini-slot, time slot, subframe, radio frame, TTI, short TTI, interleaving time, etc.

The scenario described below sets out a UE served by a first cell (cell1). Cell1 is managed or served or operated by a network node (NW1) e.g. a base station. The UE may operate in a certain coverage enhancement (CE) level w.r.t. a certain cell e.g. w.r.t. cell1. The UE is configured to receive signals (e.g. paging, wake up signals (WUS), narrowband NPDCCH, MPDSCH, PDSCH etc) from at least cell1. The UE may further be configured to perform one or more measurements on cell1 and one or more additional cells e.g. neighbor cells.

Methods in a Wireless Device

The disclosure provides several embodiments or aspects related to the wireless device (e.g. UE). In the following, the wireless device operates under cell1 served by network node NW1.

Step 1:

In a first step of the first aspect of the wireless device embodiment, the UE determines the synchronization status of its transmitter and/or receiver. Note that this step may be performed before or after step 2, described below, and thus this step may correspond also to either of steps 1604 and 1702 described below.

The transmitter may be synchronized in order to be able to transmit signals in the uplink and this synchronization is typically based on received downlink signals. Therefore the receiver may also be synchronized. Determination of synchronization information can be made in several ways and may comprise different types of information which can help the UE to determine the synchronization status.

The synchronization status can be determined using the activity related synchronization which can be either explicit or implicit information indicating the frequency- and/or timing drift of the UE wrt cell1.

An example of explicit synchronization related information is a predefined mapping table between a DRX configuration of the UE and frequency/timing drift in the receiver/transmitter. Such mapping may be predefined in the specification of a communications standard. An example of implicit synchronization related information is UE autonomously creating a mapping table between the DRX configuration and frequency/timing drift in the receiver/transmitter or using historical synchronization information.

This information can be based on historical statistics, pre-defined information, or received configuration. The synchronization status of the UE can be determined based on the UE activity level in cell1 e.g. UE receiver and/or UE transmitter activities. UE may also determine the synchronization related information based on UE activity level in cell1, e.g. UE receiver and/or UE transmitter activities.

An example of the UE activity related information comprises one or more of a DRX cycle configuration, (e.g. DRX cycle length, whether normal DRX or eDRX is configured, PTW window etc), UE DTX cycle etc. The frequency and/or timing drift may be linked to the DRX configuration as shown in Table 1 below:

TABLE 1

Example showing the link between DRX configuration and synchronizationstatus of a NB-IoT UE

| DRX cycle (s) | Frequency drift [Hz] | Timing drift [s] |
|---|---|---|
| 1.28 | 170.8 | 4.0960e−08 |
| 2.56 | 311.6 | 1.6348e−07 |

TABLE 1-continued

Example showing the link between DRX configuration
and synchronizationstatus of a NB-IoT UE

| DRX cycle (s) | Frequency drift [Hz] | Timing drift [s] |
|---|---|---|
| 5.12 | 593.2 | 6.5536e−07 |
| 10.24 | 1156.4 | 2.6212e−06 |

The activity level is an indication of a state of the UE synchronization with respect to the network (e.g. w.r.t. cell1) such that a lower UE activity level implies less synchronization and a higher UE activity level implies better synchronization. When the synchronization level is low then the UE may require a greater number of attempts to receive the same signal as compared to the case when the synchronization level is high. As an example, the UE activity level can be expressed or determined in terms of one or more of the following criteria:

DRX configuration of the UE and

Type of service or application being used by the UE.

An example showing the link between the service- or application type and the synchronization status of the UE is shown in Table 2.

TABLE 2

Example showing the link between service type
and UE synchronization status in RRC IDLE state

| Service ID | Synchronization level |
|---|---|
| 1 | High |
| 2 | High |
| 3 | Medium |
| 4 | Low |

Figure 4:
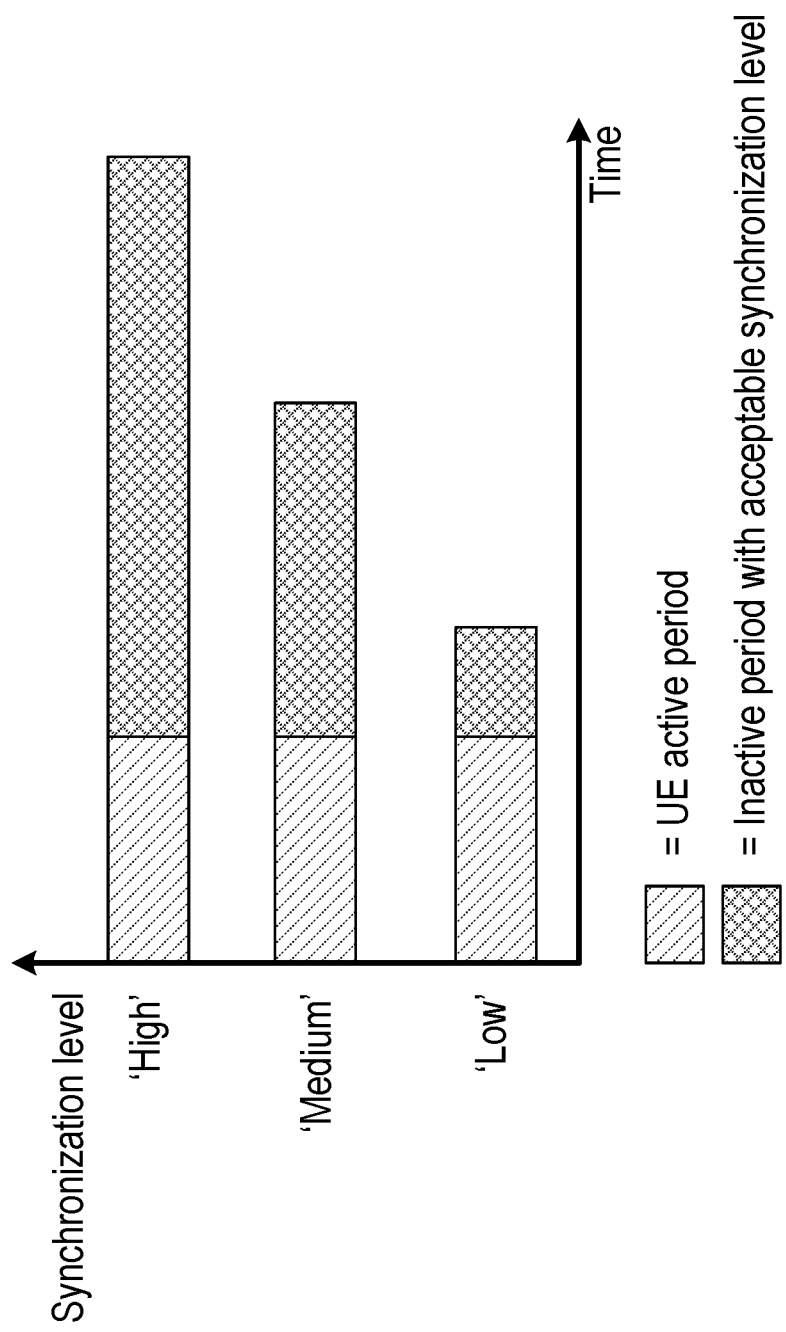
FIG. 4 is a schematic diagram showing a link between service type and synchronization level according to embodiments of the disclosure.

In Table 2, synchronization level High means that UE transmitter/receiver is expected to be tightly synchronized to cell1 for a certain duration during a UE inactive period (e.g. DRX OFF duration), and it is feasible to carry out reliable transmission of signaling using PUR. The UE transmitted signal is considered reliable if it can be received by the BS receiver in cell1; otherwise the signal is considered unreliable. An unreliable signal may also be called as failed transmission, incorrect transmission etc. Specific examples of reliable transmission are: signals transmitted by the UE at a time or moment which is known to the base station receiver in cell1, signals transmitted by the UE can be received by the base station receiver in cell1 within a certain time period (e.g. within X % of the cyclic prefix of the uplink symbol e.g. X=30, 50 etc), signals transmitted by the UE can be decoded by the base station receiver in cell1 etc. Synchronization levels Medium or Low mean that the level of synchronization is less than High and means that reliable transmissions may not be possible. In another example, UE synchronization level High means that the duration for which the UE can keep or maintain synchronization (i.e. frequency and/or timing drifts) to an acceptable level is longer than in the case when it is Medium or Low, as shown in FIG. 4.

Figure 2:
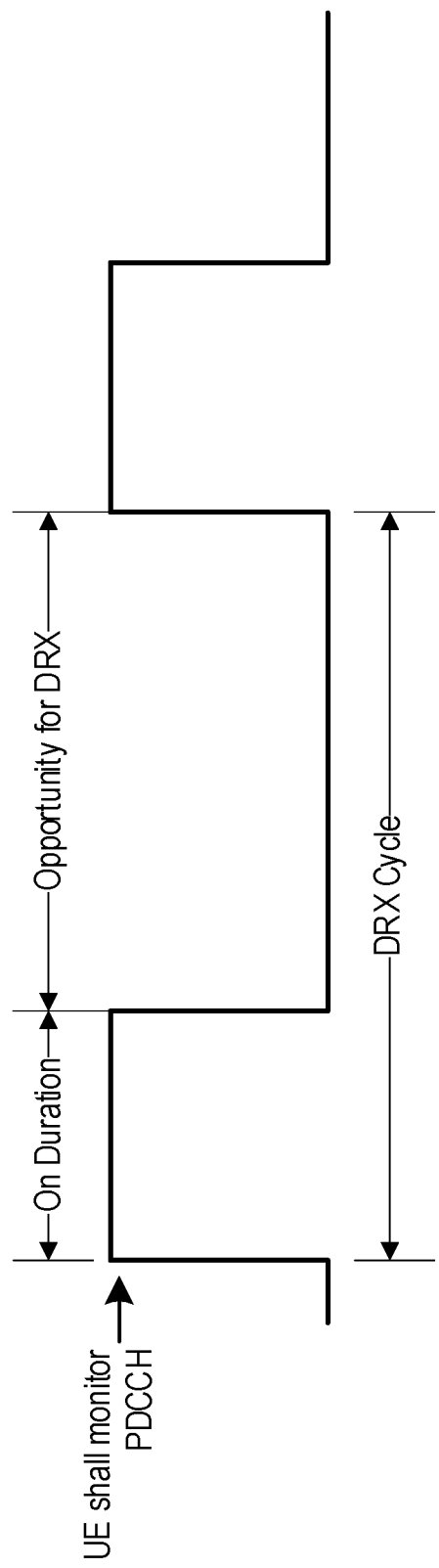
FIG. 2 shows DRX cycle operation in LTE.

The above criteria are elaborated on below with examples:

DRX Cycle Configuration:

The DRX related information obtained by the UE node is described above with respect to FIGS. 1 and 2. The used DRX related information is known to the UE since the UE has received this configuration from its serving cell (cell1) and uses it. The UE may also obtain this information from a third-party node (which may be the case for IoT type of devices) or any other network device. From this information, the UE knows how frequently it is going to be awake, for how long it is going to be awake, and its active time.

Since IoT type of devices are typically expected to receive or transmit infrequent bursts of short data packets, the UE may be configured with DRX configurations that allow the UE to sleep for a long time and save its battery life. However, there might be different types of IoT devices which require different types of DRX configurations. For example, a device deployed in an office environment might be configured to wake quite frequently while another device which is deployed in farming/rural fields might be configured to wake only occasionally during a day. The former UE might be configured with normal DRX with a DRX length of 2.56 seconds while the latter UE might be configured with eDRX with an eDRX length of 40+ minutes.

Similar to the DRX cycle lengths, the activity time may also differ depending on the device type. In one example the activity level is determined indirectly by the DRX or eDRX cycle duration, and/or the PTW duration.

When the DRX cycle is longer than a certain DRX cycle threshold (H) then the UE activity may be considered to be low compared to the case when the DRX cycle is shorter than or equal to H. Also when DRX cycle is longer than H then the UE synchronization level is low compared to the case when the DRX cycle is shorter than or equal to H. Examples of H are 1280 ms, 2560 ms etc. For example a DRX cycle of 1280 ms may be associated with lower UE activity level compared to the case when the DRX cycle is 320 ms.

Type of Service or Application:

The obtained information about the type of service or application may further comprise one or more of the following:

Device type in terms of its mobility state; e.g. whether it is a stationary device, a mobile device, a so-called semi-mobile device etc. This in turn may indicate the type of service used by the UE. For example, a stationary device, which can be a sensor, may transmit and/or receive data very infrequently e.g. once every 15-30 minutes. In this case the UE activity level may be considered low. But if the device exhibits some level of mobility (i.e. it moves frequently or occasionally) then its activity level may be considered to be moderate or high. The UE's own mobility state should be known to the UE and can be determined based on one or more of the following mechanisms: rate of cell changes (e.g. number handovers per unit time), Doppler speed of the UE estimated by the UE, based on changes in measurements, or based on information received from other nodes in the network, e.g. positioning node, core-network, third-party node, etc.

Specific type of service or application for which the device is being used; e.g. for temperature monitoring, in houses for alarm monitoring, in buildings for detecting activity, in farming fields etc. This type of information can be obtained from:

A network node storing information about the application or service used by the UE e.g. core network node, third-party node etc.

third party node application server subscription information or operator data

SIM card

Historical data or statistics

Estimation of traffic activity e.g. average UE bit rate, relation between average UE bit rate and peak UE bit rate etc.

The mobility of the device may also depend on the type of service/application it is used for offering. For example, IoT devices deployed in a field might be stationary while the IoT devices deployed in vehicles might be mobile.

The determined synchronization can either be instantaneous information or it can be general information. In the former case, it indicates the UE receiver/transmitter is synchronized to the cell1 at the current moment. In the latter case, it is a more general synchronization information about what is the expected length of T1, i.e. for how long the UE can remain synchronized. The values of T1 and T2 are known at this stage.

Figure 3:
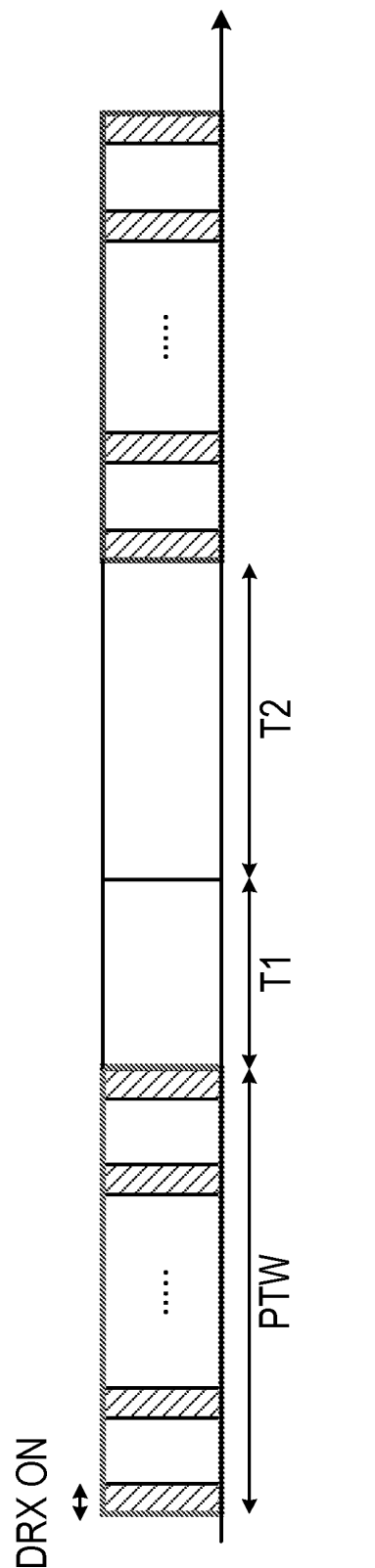
FIG. 3 shows UE synchronization states in RRC_IDLE state according to embodiments of the disclosure.

In some embodiments, the determined information can be as illustrated in FIG. 3, i.e. showing how long the UE is expected to be in synchronization (T1) with respect to cell1 and how long it is expected not to be synchronized. The T1 period is also interchangeably called the UE active period, while the T2 period is interchangeably called the UE inactive period. Examples of UE active periods are DRX ON, and/or the period during which the UE receiver/transmitter is synchronized to cell1 with acceptable level (such that reliable transmissions/receptions are possible or meeting the requirements). Examples of inactive period are DRX OFF, and/or periods during which the synchronization is too poor to carry out reliable transmissions/receptions towards cell1.

Step 2:

In this second step, the UE obtains information about PUR configuration.

This information may comprise one or more of the following non-exclusive list:
whether or not the UE is PUR capable
whether or not the UE is assigned any PUR transmission resources, e.g. periodic, aperiodic resources PUR resources can be of different types, namely dedicated, contention-free shared or contention-based shared PUR resource. The obtained information about PUR configuration may comprise, for example, the PUR transmission periodicity (e.g. PUR transmission resource taking place every Nth ms and for a duration of M ms), PUR start position, and timing advance information with respect to the target cell.

For example, the PUR configuration may be received in a configuration message from the network node of base station. Thus in some embodiments this step may correspond substantially to step 1602 described below.

Step 3:

In a third step of the first aspect of the wireless device embodiment, the wireless device uses the determined information on synchronization state and PUR configuration to adapt the PUR transmission scheme. This step may correspond substantially to step 1606 described below. Such adaptation may comprise the UE actively choosing not to use the already assigned PUR transmission resources based on the synchronization state wrt cell1 (e.g., if the UE is unsynchronized with cell1). In one embodiment, the UE may take any of the following actions:
Suspending the PUR transmission
Dropping the PUR transmission
Delaying the PUR transmission
UE releasing the PUR transmission resource and/or informing the network node
UE informing the network node about its decision to skip the PUR transmission The motivation for taking any of the above actions is that if the determined synchronization status indicates that transmissions are likely to be unreliable, then it is better not to carry out such unreliable transmission. The unreliable transmission can create unwanted interference in the network, and also waste radio resources.

The determined synchronization information in previous step indicates whether the UE receiver/transmitter is expected to be synchronized to the cell during time duration T1 and T2, and the durations of T1/T2 are known. Part of the time where the synchronization is of acceptable level is noted as T1. On the other hand during T2 the synchronization status wrt cell1 is too poor to carry out reliable transmissions. During T1, the UE may be allowed to use the already assigned PUR resources or to perform PUR transmissions, whereas during T2 any PUR transmissions may be prohibited.

The determined synchronization information in the previous step indicates whether the UE receiver/transmitter is expected to be synchronized to the cell during time duration T1 and T2.

Figure 5:
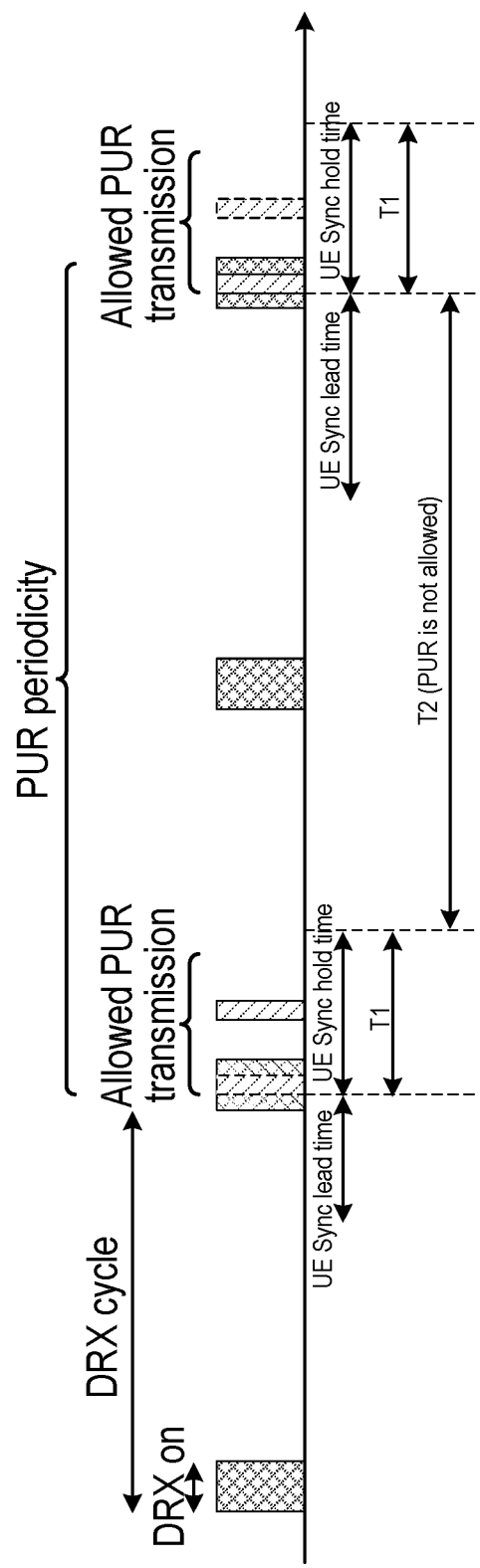
FIG. 5 is a schematic diagram showing a relation between PUR periodicity, a time period that a wireless device can maintain synchronicity to an acceptable level (T1), and a time period that the wireless device is unable to maintain synchronicity to an acceptable level (T2), according to embodiments of the disclosure.

As FIG. 5 shows, there is a lead time at the UE to wake even before the DRX on duration, to prepare the DRX to receive signals (e.g., to synchronize with the network node) which depends on UE implementation. Once the UE is synchronized to the network by monitoring the common channel, the UE is ready to make a PUR transmission. T1 is related to how long the UE can hold its sync accuracy so in this period, there are several PUR transmission possibilities dependent on how long the period is. After T1, it is assumed that the UE loses synchronization with the network node unless it continues to monitor the serving cell common channel or PUCCH which is not required after the first PUR transmission and nor during a DRX ON period.

T2 is therefore defined as the time duration from the point in time when network synchronization is lost until the time the UE regains synchronization to its serving cell. In this specific example (related to one type of implementation), T2 is greater than the UE sync lead time, see FIG. 5. This lead time may be quite long for a bandwidth-reduced, low-complexity (BL) coverage enhancement (CE) UE if the UE is in extended coverage. It will be noted that FIG. 5 shows a DRX ON period during T2, i.e. when PUR transmissions are not permitted as the UE has lost (or is assumed to have lost) its synchronization with the network node. In other embodiments, the periods T1 (when the UE is assumed to have synchronization with the network node) may correspond substantially to DRX ON periods, and may extend beyond the end of DRX ON periods for a period of time (e.g., dependent on a connection state of the UE, a service or application type, etc). Periods T2 (when the UE is assumed to have lost synchronization with the network node) may then commence, until the next DRX ON period or other event triggering synchronization with the network node.

In one example, the determined synchronization information indicates that the UE is currently in time period T1, and therefore also synchronized to cell1. In this case, the UE will proceed with the PUR transmission as planned.

In another example, it is determined that the UE is configured with PUR resources, but not synchronized or not expected to be synchronized wrt cell1 when PUR is taking place. In this case, the UE may either suspend, postpone, drop the PUR transmission and/or release the PUR resource.

In yet another example, the T1 and period (D1) for PUR resource may or may not be time aligned wrt each other. The period (D1) for PUR resource herein means the duration over which the PUR resources are configured for PUR transmission in cell1. PUR resources can be of different types, namely dedicated, contention-free shared or contention-based shared PUR resource. A PUR resource is defined as a PUSCH resource, i.e. it is a resource in both time- and frequency domain. In the case of NB-IoT, PUR resource is the same as the NPUSCH resource. For cat-M, it is 6 PRBs and the same as the PUSCH resource. Analogous to PUSCH and NPUSCH, repetitions can also be used for PUR transmissions, which is especially the case when operating under extended coverage. The D1 period comprises the radio resource (e.g. subframe n) starting from the first repetition until the radio resource in the last repetition (e.g. subframe n+16).

Figure 6:
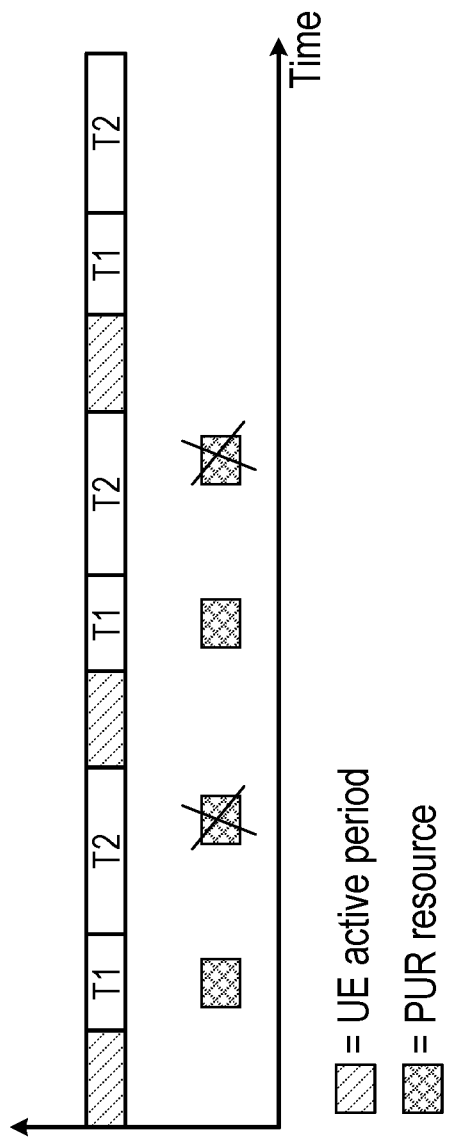
FIG. 6 is a schematic diagram showing a PUR resource alignment with UE synchronization status according to embodiments of the disclosure.

T1 and D1 are considered time aligned wrt each other provided D1 fully occurs within T1; otherwise T1 and D1 are not considered to be time aligned (may also be called as time misaligned). In one specific example, T1 and D1 are time aligned if all NPUSCH or PUSCH transmission resources (including all repetitions) take place within T1. If T1 and the period for PUR resources (D1) are aligned, then the UE is allowed to carry out the PUR transmissions. Otherwise, if a PUR periodic resource does not fully occur within T1 (e.g. occurs during T2), then PUR transmissions are suspended, delayed, dropped, or released as illustrated in FIG. 6.

In another example, T1 and D1 can be partly aligned and in this case the UE may choose to delay, suspend, drop or release the PUR resource.

In a second UE embodiment, the UE uses the determined information (e.g. in steps 1 and/or 2) to adapt the further PUR resource request procedure. This step may correspond substantially to step 1704, described below. If the duration (D1) of the PUR transmission resources is not aligned with the period (e.g. T1) when the UE is synchronized wrt cell1, then the UE may send a request to the network node to modify the PUR resource allocation (e.g. PUR resource periodicity). For example the network node may reallocate or update PUR resources to ensure that they fully overlap with UE active period (T1) e.g. when the UE is synchronized wrt cell1. In another example, the UE may use the determined synchronization status to request new PUR resources, taking into account the UE active (T1) and inactive period (T2).

In a third UE embodiment, the UE may obtain and report its capability on the synchronization lead time to the network before the PUR transmission when it lost the synchronization or its synchronization accuracy is poor to the network. The network will use this information to configure or confine the UE PUR transmission occurrence depending the network PSSS/SSS channel presence. For example, if the BL UE is in CEModeB and needs quite a long lead time to resync to the network once it has lost synchronization to the network, the network may not configure the PUR resource to this UE or it may only allow PUR transmission within DRX window or the PUR transmission window may be adapted to take account of the lead time so the UE can synchronize to the network before any reliable PUR transmission. This embodiment is described in more detail below with respect to FIG. 18.

Methods in a Network Node

The disclosure also provides several embodiments related to the network node (e.g. eNodeB). In one embodiment (as described below with respect to FIG. 20), a method may be summarized as the network node:

receiving a request from a UE for PUR resource (see step 1 below), network node obtaining information about UE synchronization state (see, e.g., step 2 or step 2002 below), and adapting the PUR resource allocation procedure based on above information (see, e.g., step 3 or step 2004 below).

Step 1:

In the first step, the network node receives a PUR request from a wireless device, and such request may comprise information on e.g. PUR periodicity, PUR duration, service/application type etc. Service and application types are described above in respect of the third UE embodiment. The PUR resource configuration described in step 2 of the first UE embodiment above may also be applicable here.

Step 2:

In this step (see also step 2002 below), the network node obtains information relating to the UE synchronization state. The embodiment described in step 1 of the first UE embodiment is also applicable here.

Figure 7:
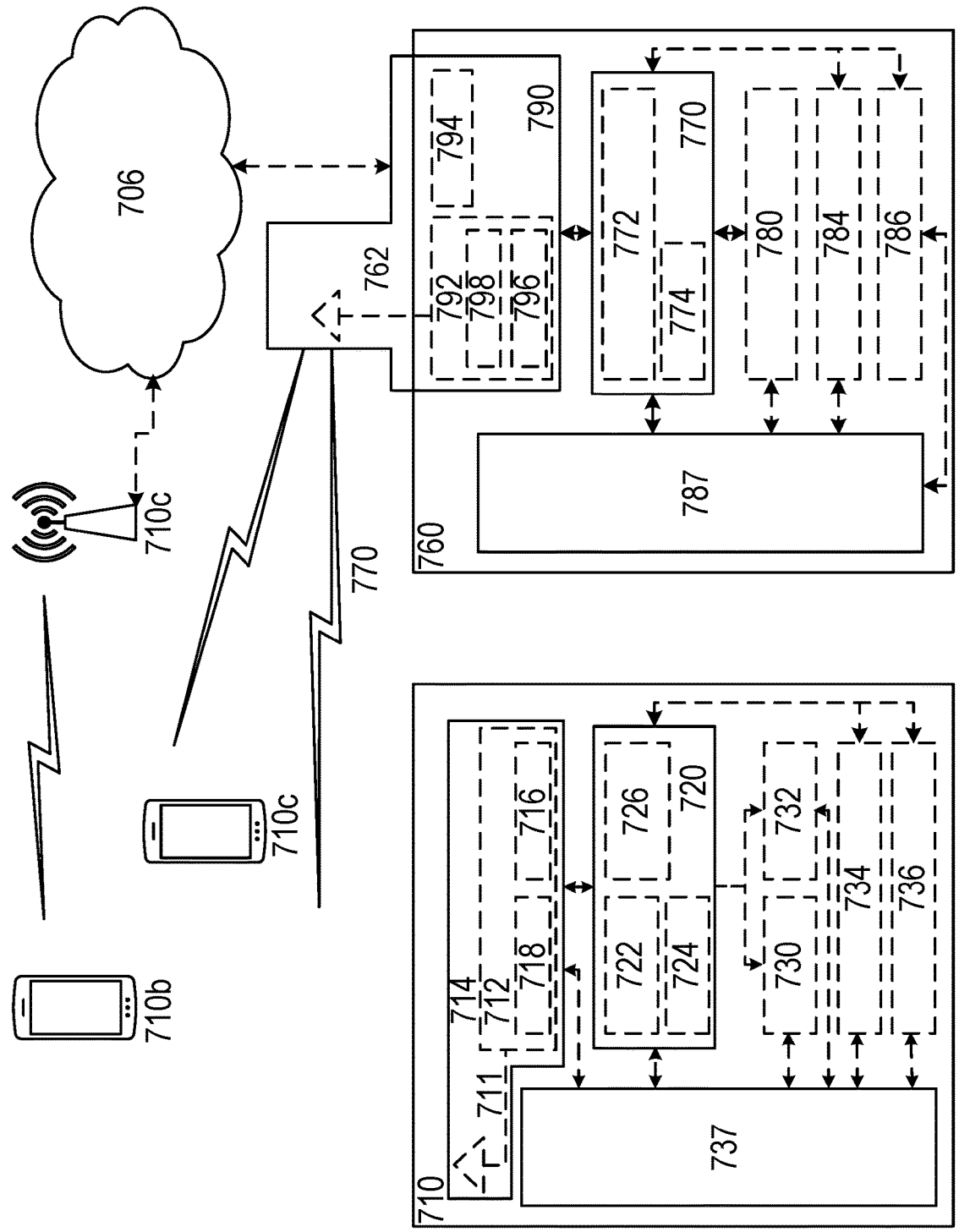
FIG. 7 shows a wireless network according to embodiments of the disclosure.

Step 3:

In this step (see also step 2004 below), the network node adapts the PUR resource allocated to the UE based on the information obtained in steps 1 and/or 2. The procedure of adapting the resource is similar to those described in step 3 of the first UE embodiment. If the obtained information indicates that the UE is out of synchronization or PUR transmission is unreliable when PUR transmission is scheduled to take place, then it may take one or more of the following actions (non-exclusively listed):

suspending the PUR resources for said UE releasing the PUR resources for said UE reallocating the PUR resources to other UEs Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
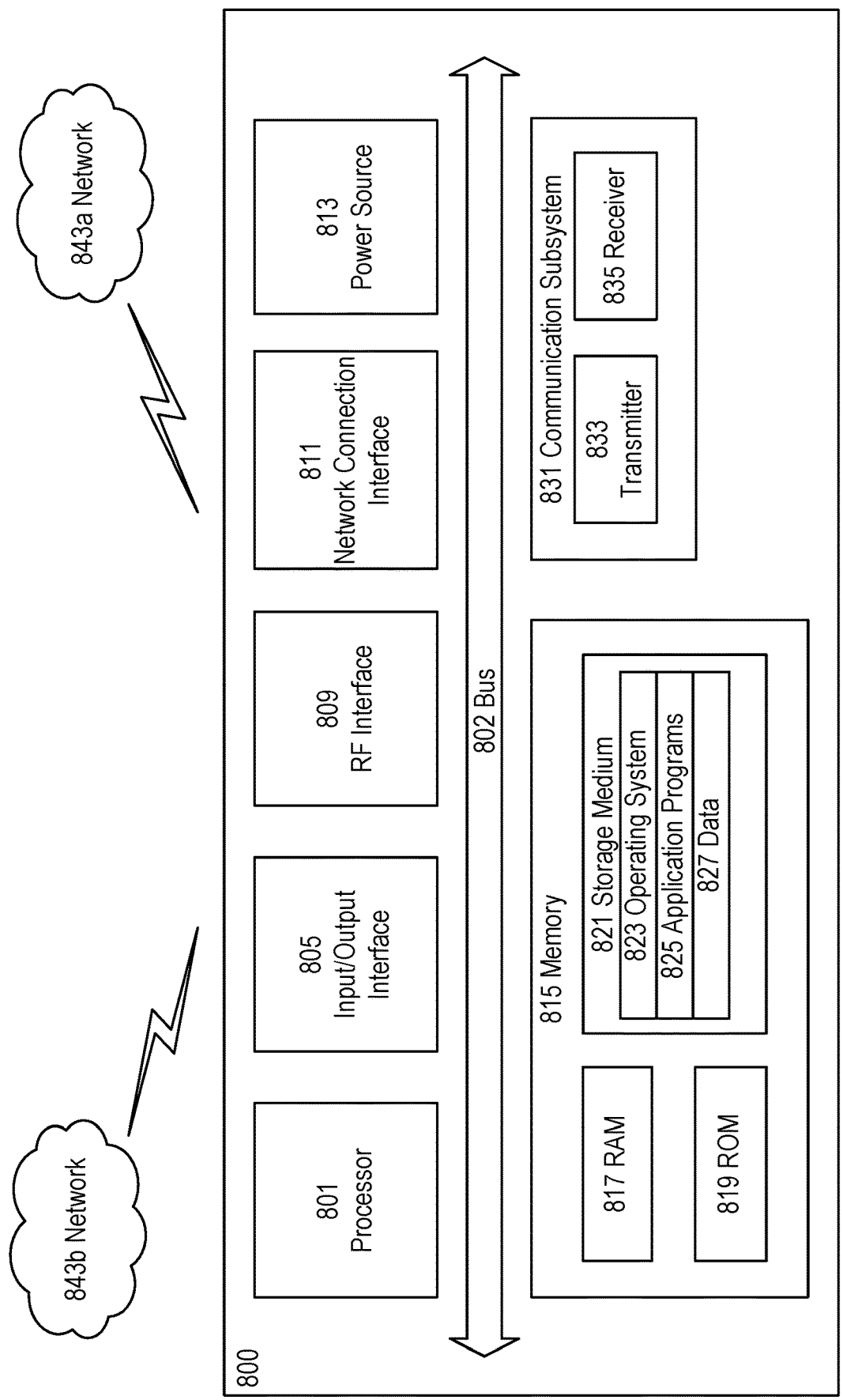
FIG. 8 shows a user equipment according to embodiments of the disclosure.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
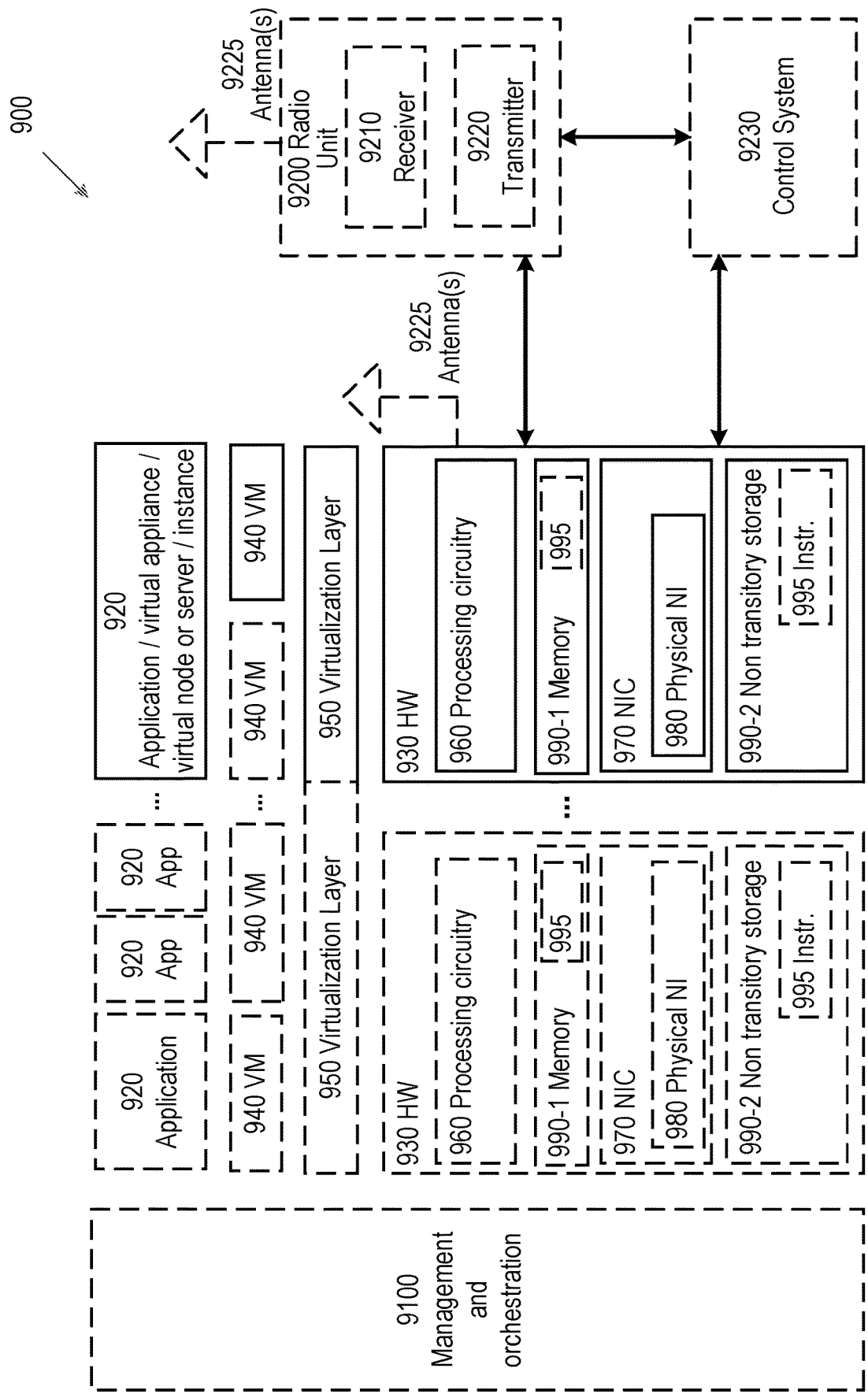
FIG. 9 shows a virtualization environment according to embodiments of the disclosure.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
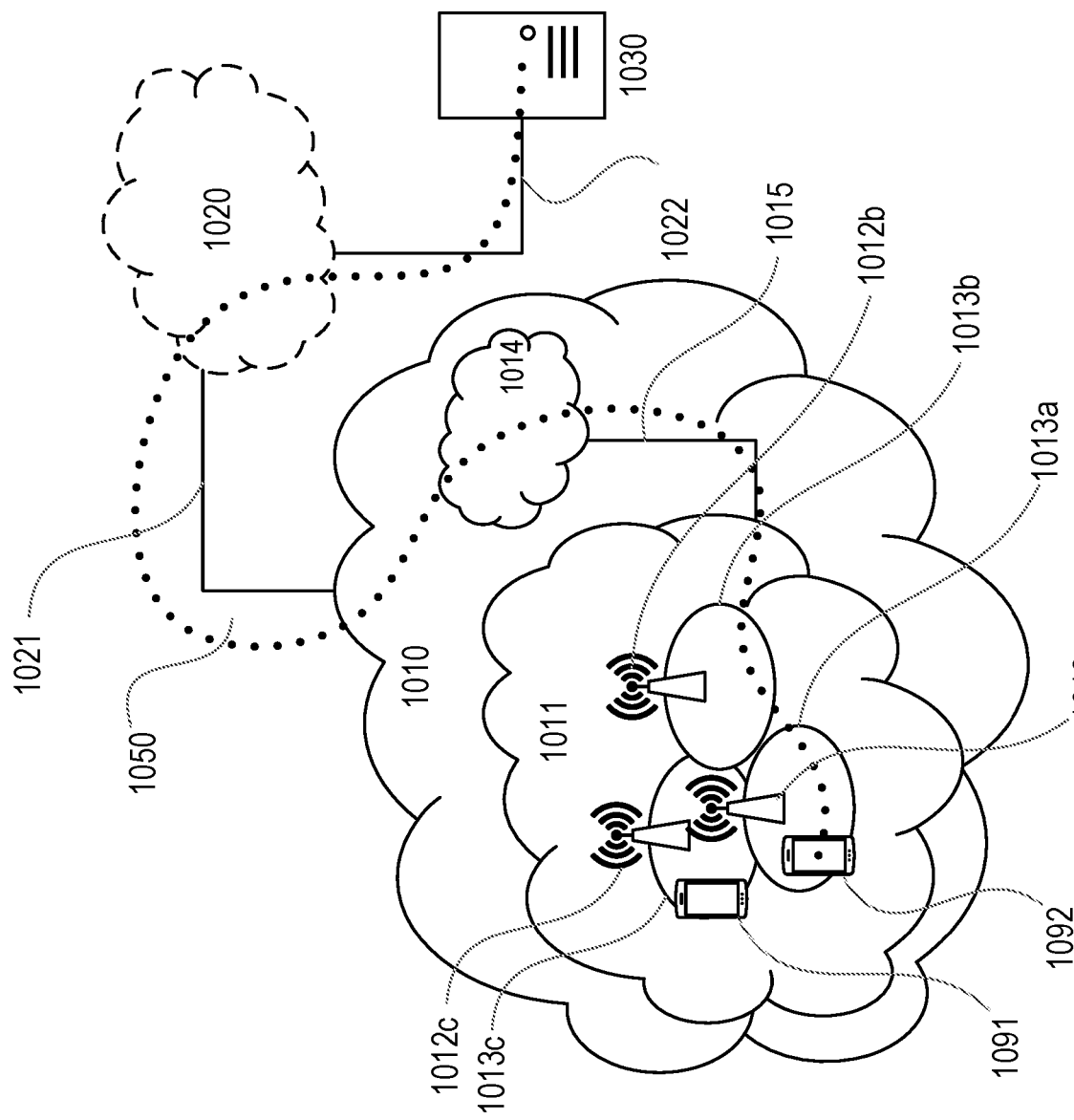
FIG. 10 shows a telecommunication network connected via an intermediate network to a host computer according to embodiments of the disclosure.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
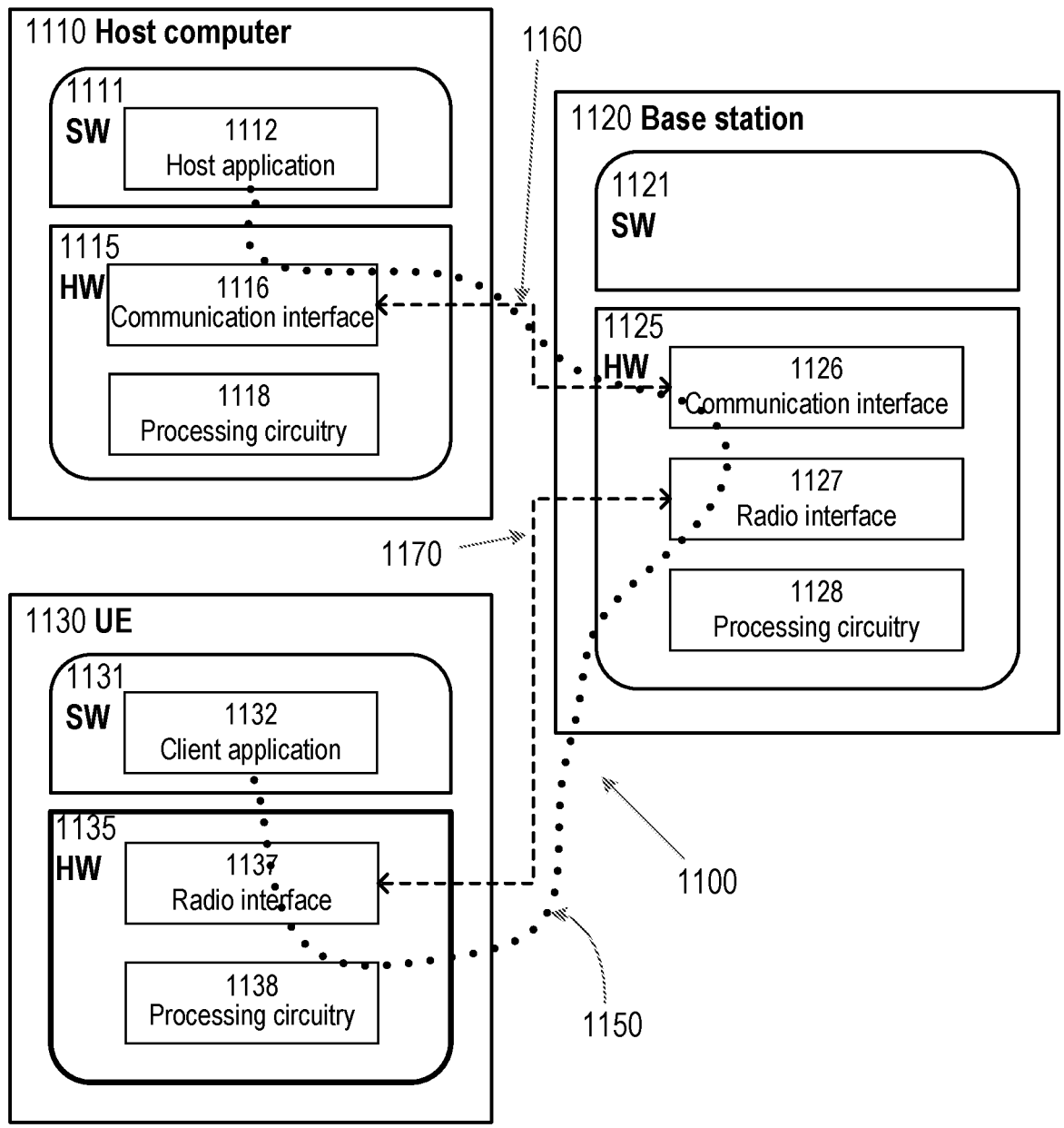
FIG. 11 shows a host computer communicating via a base station with a user equipment over a partially wireless connection according to embodiments of the disclosure.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the power consumption of devices and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
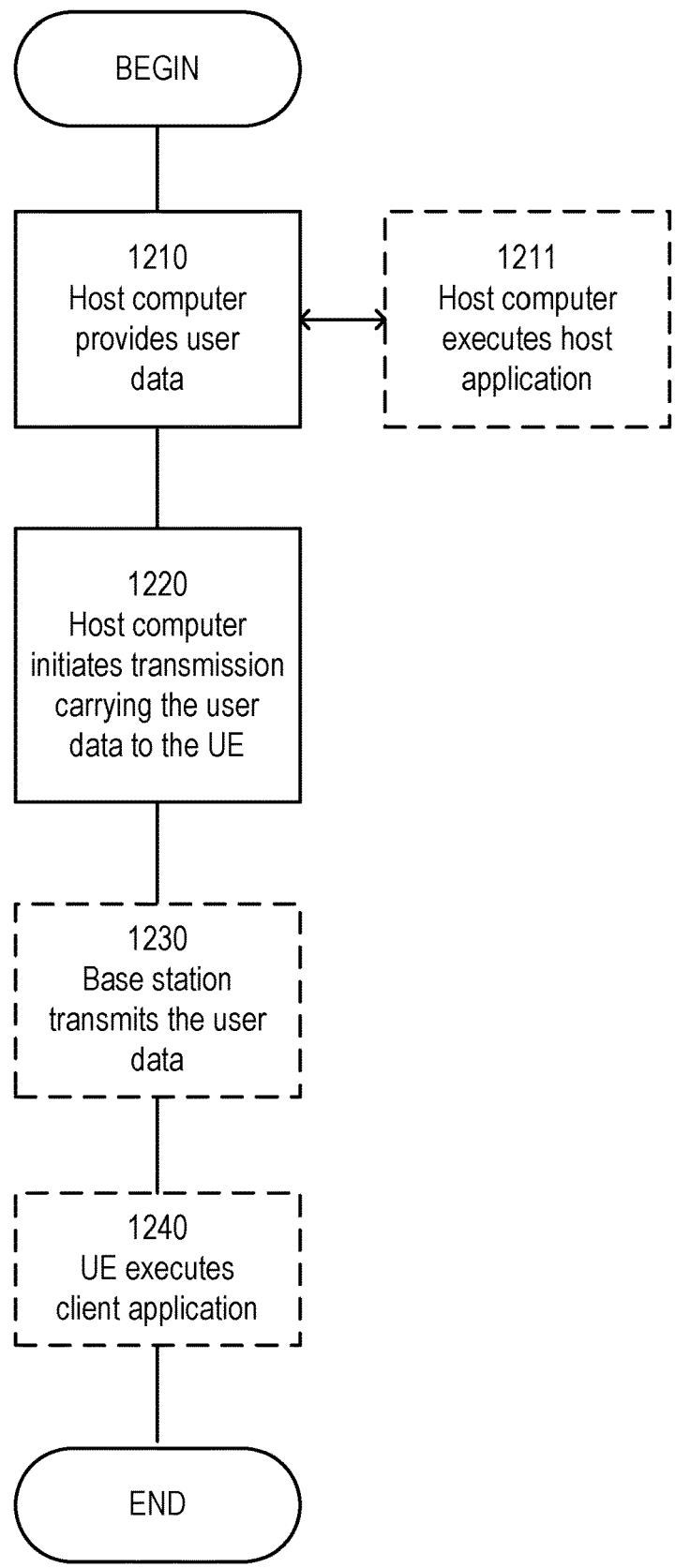
FIGS. 12 to 15 show methods implemented in a communication system including a host computer, a base station and a user equipment according to embodiments of the disclosure.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
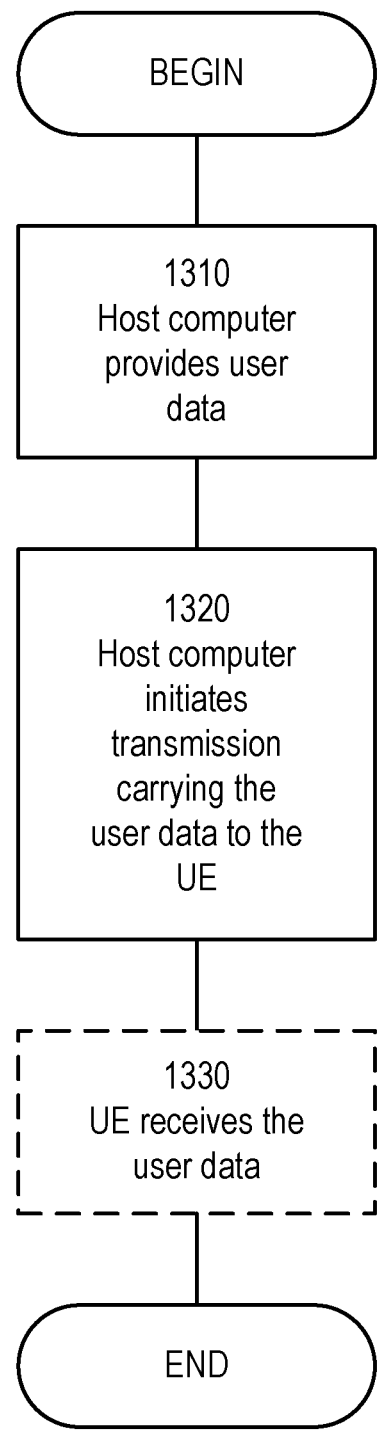

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
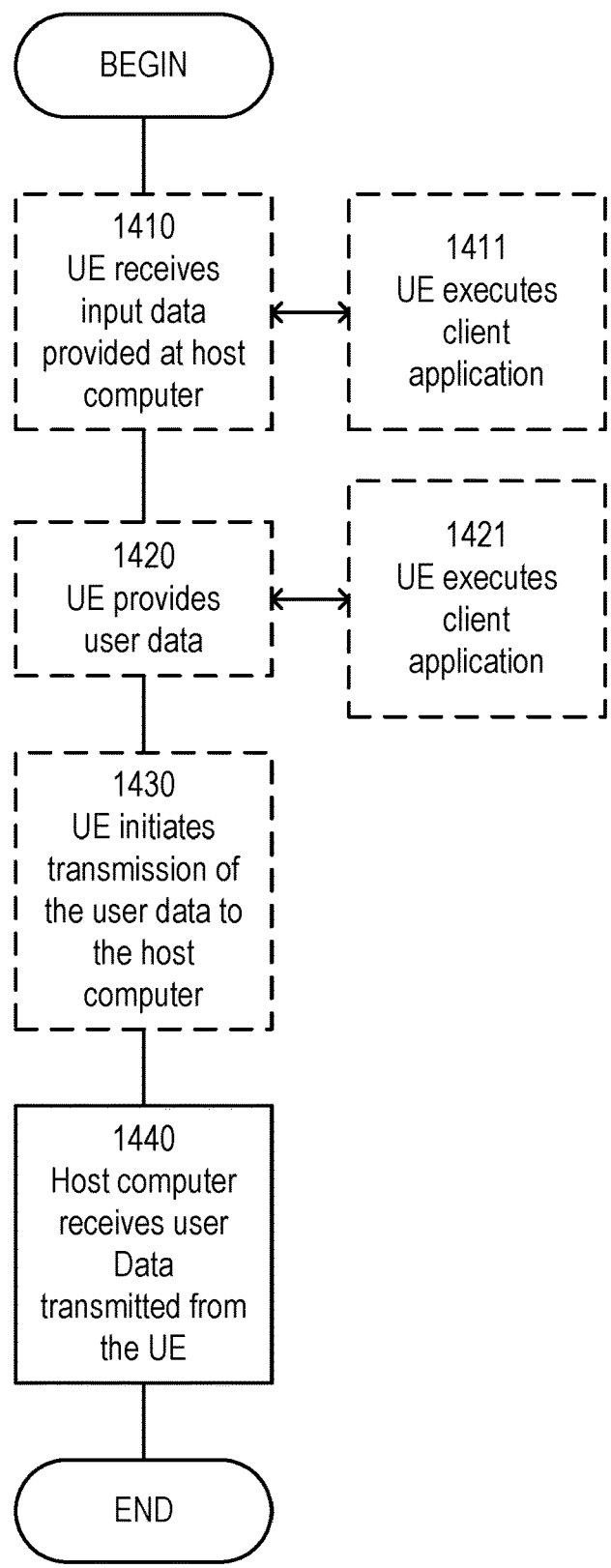

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
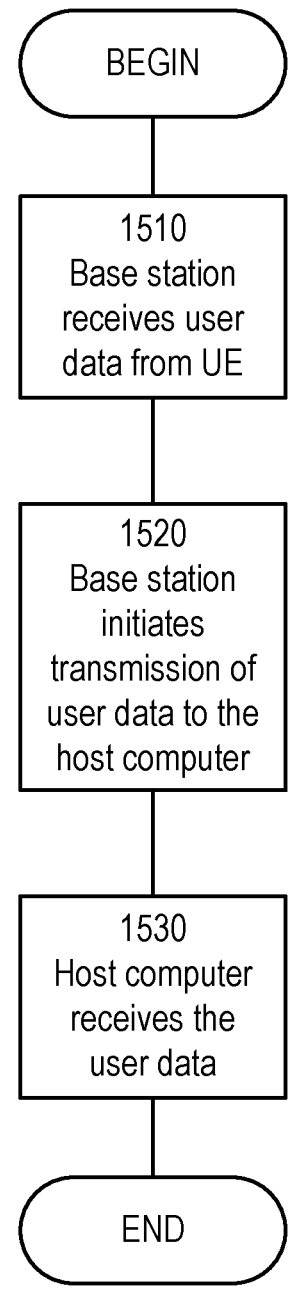

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Figure 16:
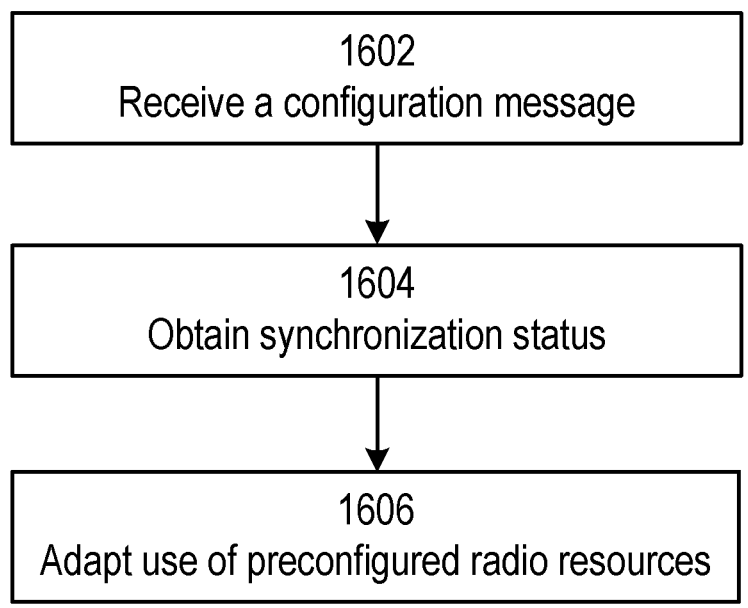
FIGS. 16 to 18 are flowcharts showing methods performed by a wireless device according to embodiments of the disclosure.

FIG. 16 depicts a method in accordance with particular embodiments. The method may be performed by a wireless device (e.g., such as the wireless device 710 or UE 800 described above). The wireless device may be a MTC-type device or an NB-IOT type device.

The method begins at step 1602, in which the wireless device receives, from a network node, a configuration message comprising an indication of preconfigured radio resources for uplink transmissions. The preconfigured radio resources (e.g., PUR) may be configured for use while the wireless device is in a low-power or inactive state (e.g., such as RRC_IDLE, RRC_INACTIVE, etc).

The configuration message may be transmitted by the network node while the wireless device is in an active state, such as RRC_CONNECTED, for example. The configuration message may be transmitted using RRC signalling or any other suitable signalling protocol.

The preconfigured radio resources may comprise one or more of: dedicated radio resources for the wireless device; contention-free shared radio resources; and contention-based shared radio resources. As used herein, radio resources is taken to refer to any combination of time and/or frequency resources. Thus, in one embodiment, the preconfigured radio resources comprise periodic time resources. The preconfigured radio resources may alternatively or additionally comprise a physical uplink data channel, such as PUSCH or NPUSCH (e.g., the frequency resources for such a channel).

In step 1604, the wireless device obtains a synchronization status of the wireless device with respect to the network node. This step is described in more detail above, with respect to Step 2 of the UE embodiment.

For example, the wireless device may obtain the synchronization status of the wireless device with respect to the network node by obtaining the synchronization status of one or more of a transmitter and a receiver of the wireless device with respect to the network node.

In one embodiment, the wireless device obtains the synchronization status of the wireless device with respect to the network node based on a radio activity level of the wireless device. This is described in more detail above.

In one embodiment, the radio activity level of the wireless device comprises a service or application type utilized by the wireless device. See, for example, table 2 shown above. In a further embodiment, the radio activity level of the wireless device comprises or is based on a discontinuous reception, DRX, configuration of the wireless device. The DRX configuration may comprises a DRX cycle length, such that DRX cycle lengths which are relatively long are associated with relatively long periods when the wireless device is unsynchronized with the network node (e.g., T2 is relatively long, see above), whereas DRX cycle lengths which are relatively short are associated with relatively short periods when the wireless device is unsynchronized with the network node (e.g., T2 is relatively short, see above).

The radio activity level of the wireless device may be mapped by the wireless device to a synchronization status. For example, a look-up table may be defined showing a mapping between particular radio activity levels and corresponding or respective synchronization statuses. As noted above, the look-up table (or other mapping) may be preconfigured by the network, or determined by the wireless device, e.g., based on historical statistics.

The obtained synchronization status may be instantaneous (i.e., corresponding to an instantaneous measurement) or inferred based on a set of rules or the mapping discussed above. In one embodiment, the synchronization status may be inferred based on an amount of time elapsed since the wireless device was last synchronized with the network node. For example, the synchronization status of the wireless device with respect to the network node may be inferred based on an amount of time elapsed since a preceding DRX on duration of the wireless device. In such embodiments, the amount of time elapsed since the wireless device was last synchronized with the network node may be compared to a threshold, and the synchronization status of the wireless device inferred based on the comparison. The synchronization status of the wireless device with respect to the network node may be inferred to be unsynchronized responsive to a determination that the amount of time exceeds the threshold (e.g., the wireless device is in the T2 period described above). The threshold may be determined based on the radio activity level of the wireless device. For example, if the radio activity level is relatively high (e.g., the DRX cycle is short, the wireless device is using a relatively high service ID—see tables 1 and 2, etc) the threshold time may be set relatively high; if the radio activity level is relatively low (e.g., the DRX cycle is long, the wireless device is using a relatively low service ID—see tables 1 and 2, etc) the threshold time may be set relatively low, such that the wireless device is deemed or inferred to have become unsynchronized after a relatively short period of time.

In step 1606, the wireless device adapts use of the preconfigured radio resources based on the synchronization status of the wireless device with respect to the network node. In one embodiment, the wireless device may adapt use of the preconfigured radio resources by, responsive to a determination that the synchronization status is unsynchronized, performing one or more of: refraining from utilizing the preconfigured radio resources to transmit to the network node; suspending use of the preconfigured radio resources to transmit to the network node; cancelling use of the preconfigured radio resources to transmit to the network node; delaying utilizing the preconfigured radio resources to transmit to the network node; and releasing the preconfigured radio resources.

The method may further comprise a step (not illustrated) of transmitting, to the network node, an information message comprising an indication of the adapted use of the preconfigured radio resources. For example, the information message may comprise an indication that the wireless device has suspended or delayed its use of the preconfigured radio resources.

Figure 17:
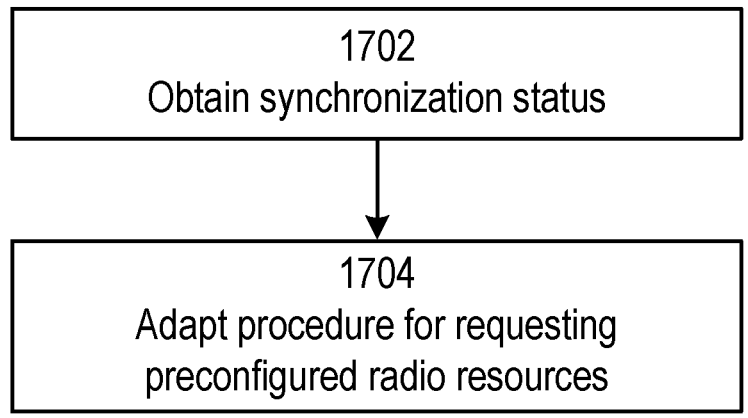

FIG. 17 depicts a method in accordance with particular embodiments. The method may be performed by a wireless device (e.g., such as the wireless device 710 or UE 800 described above). The wireless device may be a MTC-type device or an NB-10T type device.

The method begins at step 1702, in which the wireless device obtains a synchronization status of the wireless device with respect to a network node. This step may correspond substantially to step 1604 described above. The wireless device 1702 may also determine a configuration of preconfigured radio resources (e.g., PUR) in which to transmit uplink messages.

In step 1704, the wireless device adapts, based on at least the synchronization status, a procedure for requesting preconfigured radio resources from the network node for uplink transmission.

For example, if the duration (D1) of the preconfigured radio resources are not aligned with the period (e.g. T1) when the UE is synchronized wrt cell1, then the UE may send a request to the network node to modify the allocation of preconfigured radio resources (e.g. PUR resource periodicity). For example the network node may reallocate or update PUR resources to ensure that they fully overlap with UE active period (T1) e.g. when the UE is synchronized wrt cell1. In another example, the UE may use the determined synchronization status to request new preconfigured radio resources (e.g., PUR), taking into account the UE active (T1) and inactive periods (T2).

Figure 18:
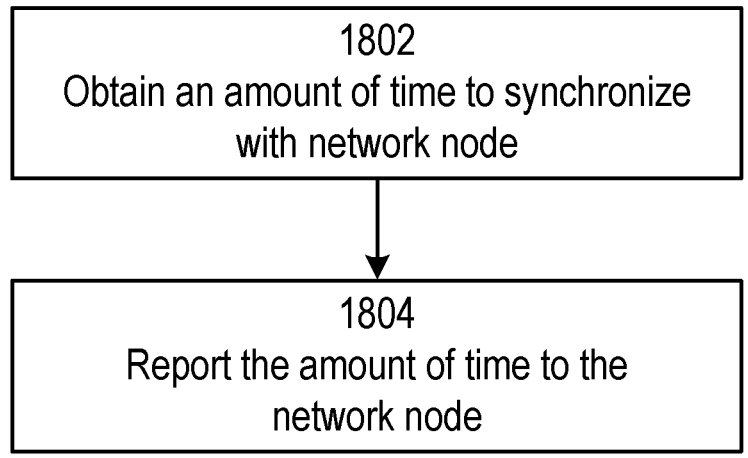

FIG. 18 depicts a method in accordance with particular embodiments. The method may be performed by a wireless device (e.g., such as the wireless device 710 or UE 800 described above). The wireless device may be a MTC-type device or an NB-10T type device. See also FIG. 22 below, which is a corresponding method in the network node or base station.

The method begins at step 1802, in which the wireless device obtains an amount of time required to synchronize with a network node. For example, the wireless device may measure the amount of time between reception of an initial common pilot signal (or other reference signal) from a network node and synchronization with the network node; alternatively, the wireless device may determine a number of repetitions of the common pilot signal before synchronization is achieved (which may be an indication of the amount of time, e.g., when the common pilot signal is transmitted periodically).

In step 1804, the wireless device reports the amount of time to the network node, enabling the network node to adapt its scheduling of preconfigured radio resources for the wireless device for uplink transmissions.

Thus, according to the method, a wireless device may obtain and report its capability on the synchronization lead time to the network prior to a PUR transmission. This may be especially relevant when the wireless device has lost its synchronization to the network or its synchronization accuracy is poor. The network is thus enabled to use this information to configure or confine the UE PUR transmission occurrence depending on the network PSSS/SSS channel presence. For example, if a BL CE UE is in CEModeB, it may require a long lead time to resync to the network once it has lost synchronization. In such a scenario, the network node may not configure such a UE with preconfigured radio resources (e.g., PUR) or it may provide preconfigured radio resources only within a DRX ON period. In a further alternative, the PUR transmission window or instance (e.g., the timing of the preconfigured radio resources) may be adapted to take into account the lead time of the wireless device, such that the wireless device can sync to the network before the PUR transmission window.

Figure 19:
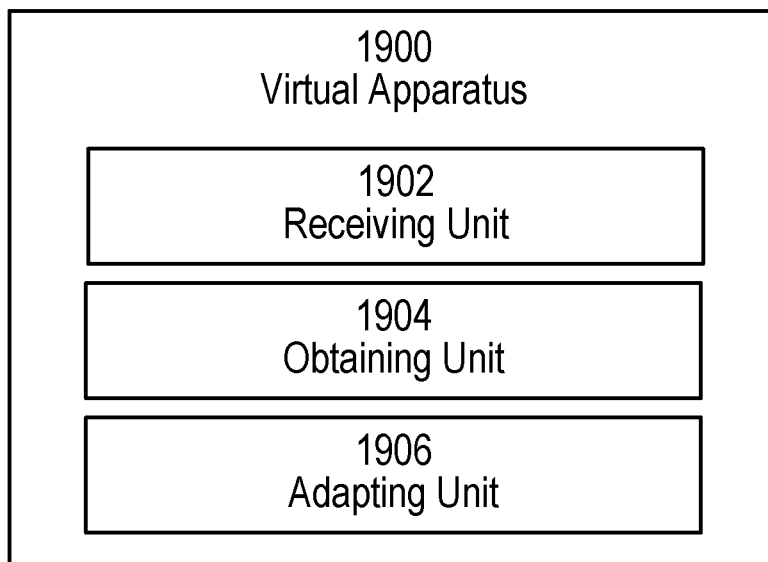
FIG. 19 shows a virtualization apparatus according to embodiments of the disclosure.

FIG. 19: Virtualization Apparatus in Accordance with Some Embodiments

FIG. 19 illustrates a schematic block diagram of an apparatus 1900 in a wireless network (for example, the wireless network shown in FIG. 7). The apparatus may be implemented in a wireless device (e.g., wireless device 710 or UE 800). Apparatus 1900 is operable to carry out the example method described with reference to FIG. 16 and possibly any other processes or methods disclosed herein (such as the methods shown in FIGS. 17 and 18). It is also to be understood that the method of FIG. 16 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1902, obtaining unit 1904, and adapting unit 1906, and any other suitable units of apparatus 1900 to perform corresponding functions according one or more embodiments of the present disclosure.

As illustrated in FIG. 19, apparatus 1900 includes receiving unit 1902, obtaining unit 1904, and adapting unit 1906. Receiving unit 1902 is configured to receive, from a network node, a configuration message comprising an indication of preconfigured radio resources for uplink transmissions. Obtaining unit 1904 is configured to obtain a synchronization status of the wireless device with respect to the network node. Adapting unit 1906 is configured to adapt use of the preconfigured radio resources based on the synchronization status of the wireless device with respect to the network node.

Figure 20:
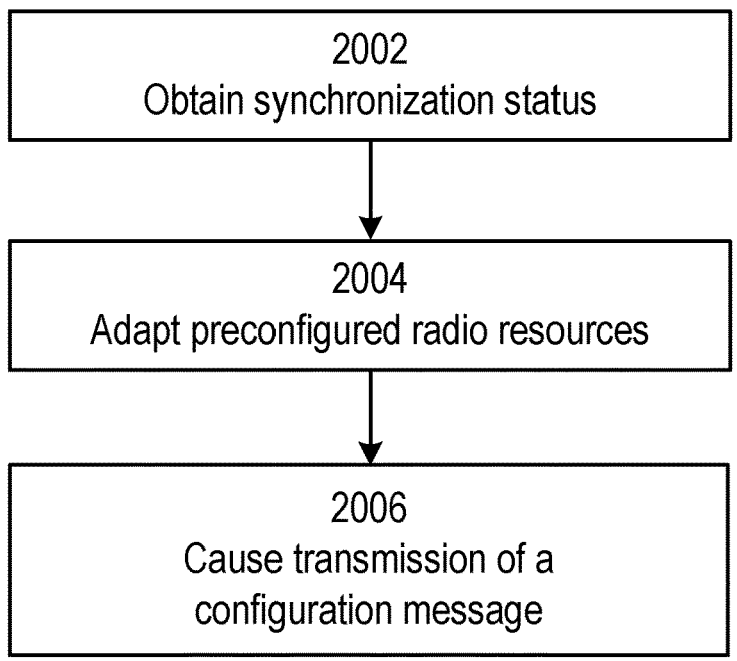
FIGS. 20 to 22 are flowcharts showing methods performed by a network node or base station according to embodiments of the disclosure.

FIG. 20 depicts a method in accordance with particular embodiments. The method may be performed by a network node or base station (e.g., the network node 760 described above).

The method begins at step 2002, in which the network node obtains a synchronization status of a wireless device with respect to the network node. This step may be performed responsive to receipt of a request from the wireless device for preconfigured radio resources for uplink transmissions (e.g., PUR). Step 2002 may correspond to Step 2 of the network node embodiment described above.

For example, the network node may obtain the synchronization status of the wireless device with respect to the network node by obtaining the synchronization status of one or more of a transmitter and a receiver of the wireless device with respect to the network node.

In one embodiment, the network node obtains the synchronization status of the wireless device with respect to the network node based on a radio activity level of the wireless device. This is described in more detail above.

In one embodiment, the radio activity level of the wireless device comprises a service or application type utilized by the wireless device. See, for example, table 2 shown above. In a further embodiment, the radio activity level of the wireless device comprises or is based on a discontinuous reception, DRX, configuration of the wireless device. The DRX configuration may comprise a DRX cycle length, such that DRX cycle lengths which are relatively long are associated with relatively long periods when the wireless device is unsynchronized with the network node (e.g., T2 is relatively long, see above), whereas DRX cycle lengths which are relatively short are associated with relatively short periods when the wireless device is unsynchronized with the network node (e.g., T2 is relatively short, see above).

The radio activity level of the wireless device may be mapped by the network node to a synchronization status. For example, a look-up table may be defined showing a mapping between particular radio activity levels and corresponding or respective synchronization statuses. As noted above, the look-up table (or other mapping) may be preconfigured by the network, or determined by the wireless device, e.g., based on historical statistics.

The obtained synchronization status may be instantaneous (i.e., corresponding to an instantaneous measurement) or inferred based on a set of rules or the mapping discussed above. In one embodiment, the synchronization status may be inferred based on an amount of time elapsed since the wireless device was last synchronized with the network node. For example, the synchronization status of the wireless device with respect to the network node may be inferred based on an amount of time elapsed since a preceding DRX on duration of the wireless device. In such embodiments, the amount of time elapsed since the wireless device was last synchronized with the network node may be compared to a threshold, and the synchronization status of the wireless device inferred based on the comparison. The synchronization status of the wireless device with respect to the network node may be inferred to be unsynchronized responsive to a determination that the amount of time exceeds the threshold (e.g., the wireless device is in the T2 period described above). The threshold may be determined based on the radio activity level of the wireless device. For example, if the radio activity level is relatively high (e.g., the DRX cycle is short, the wireless device is using a relatively high service ID—see tables 1 and 2, etc) the threshold time may be set relatively high; if the radio activity level is relatively low (e.g., the DRX cycle is long, the wireless device is using a relatively low service ID—see tables 1 and 2, etc) the threshold time may be set relatively low, such that the wireless device is deemed or inferred to have become unsynchronized after a relatively short period of time.

In step 2004, the network node adapts, based on the synchronization status, preconfigured radio resources for the wireless device for uplink transmissions. Step 2004 may correspond to Step 3 of the network node embodiment described above. For example, the network node may adapt the preconfigured radio resources by, responsive to a determination that the synchronization status is unsynchronized, performing one or more of: suspending the preconfigured radio resources; cancelling the preconfigured radio resources; delaying the preconfigured radio resources; releasing the preconfigured radio resources; and re-allocating the preconfigured radio resources to a second wireless device.

The preconfigured radio resources may comprise one or more of: dedicated radio resources for the wireless device; contention-free shared radio resources; and contention-based shared radio resources. As used herein, radio resources is taken to refer to any combination of time and/or frequency resources. Thus, in one embodiment, the preconfigured radio resources comprise periodic time resources. The preconfigured radio resources may alternatively or additionally comprise a physical uplink data channel, such as PUSCH or NPUSCH (e.g., the frequency resources for such a channel).

In step 2006, the network node causes transmission of a configuration message to the wireless device (e.g., by transmitting the configuration message or instructing another node to transmit the configuration message). The configuration message comprises an indication of the adapted preconfigured radio resources for the wireless device for uplink transmissions.

Figure 21:
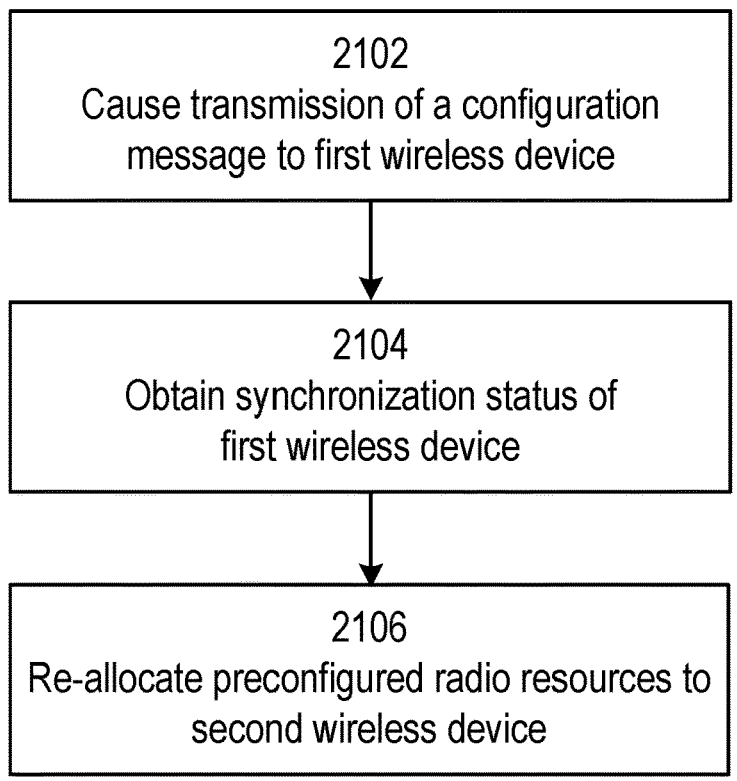

FIG. 21 depicts a method in accordance with particular embodiments. The method may be performed by a network node or base station (e.g., the network node 760 described above).

The method begins at step 2102, in which the network node causes transmission of a configuration message to a first wireless device (e.g., by transmitting the configuration message or instructing another node to transmit the configuration message). The configuration message comprises an indication of preconfigured radio resources for the first wireless device for uplink transmissions.

In step 2104, the network node obtains a synchronization status of the first wireless device with respect to the base station. This step may be substantially similar to step 2002 described above, but with respect to the first wireless device.

In step 2106, the network node reallocates, based on the synchronization status, the preconfigured radio resources to a second wireless device.

Figure 22:
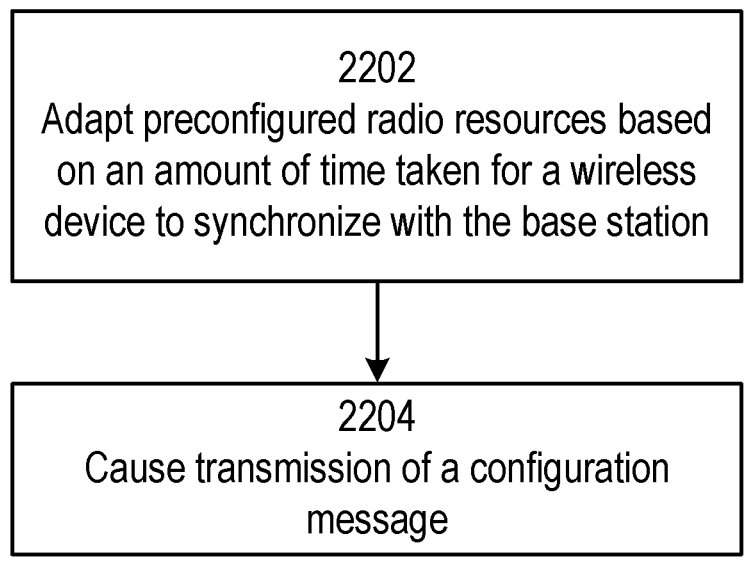

FIG. 22 depicts a method in accordance with particular embodiments. The method may be performed by a network node or base station (e.g., the network node 760 described above). See also FIG. 18 for a corresponding method performed by the wireless device.

The method begins at step 2202, in which the network node adapts preconfigured radio resources (e.g., PUR) for a wireless device for uplink transmissions. This step may be performed responsive to receipt, from the wireless device, of a report message comprising an indication of an amount of time taken for the wireless device to synchronize with the base station. Thus the preconfigured radio resources may be adapted based on the indicated amount of time.

In step 2204, the network node causes transmission of a configuration message to the wireless device (e.g., by transmitting the configuration message or instructing another node to transmit the configuration message). The configuration message comprises an indication of the adapted preconfigured radio resources for the wireless device for uplink transmissions to the base station.

Figure 23:
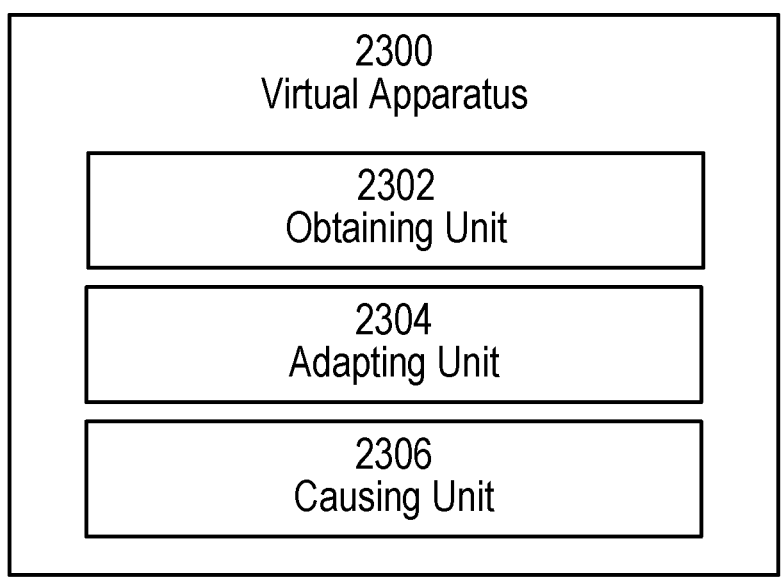
FIG. 23 shows a virtualization apparatus according to further embodiments of the disclosure.

FIG. 23 illustrates a schematic block diagram of an apparatus 2300 in a wireless network (for example, the wireless network shown in FIG. 7). The apparatus may be implemented in a network node or base station (e.g., network node 760). Apparatus 2300 is operable to carry out the example method described with reference to FIG. 20 and possibly any other processes or methods disclosed herein (such as the methods shown in FIGS. 21 and 22). It is also to be understood that the method of FIG. 20 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 2302, adapting unit 2304, and causing unit 2306, and any other suitable units of apparatus 2300 to perform corresponding functions according one or more embodiments of the present disclosure.

As illustrated in FIG. 23, apparatus 2300 includes obtaining unit 2302, adapting unit 2304, and causing unit 2306. Obtaining unit 2302 is configured to obtain, responsive to receipt of a request from a wireless device for preconfigured radio resources for uplink transmissions, a synchronization status of the wireless device with respect to the base station. Adapting unit 2304 is configured to adapt, based on the synchronization status, preconfigured radio resources for the wireless device for uplink transmissions. Causing unit 2306 is configured to cause transmission of a configuration message to the wireless device, the configuration message comprising an indication of the adapted preconfigured radio resources for the wireless device for uplink transmissions.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered paragraphs set out embodiments of the disclosure:

Group A Embodiments

1. A method performed by a wireless device, the method comprising:
    receiving, from a network node, a configuration message comprising an indication of preconfigured radio resources for uplink transmissions;
    obtaining a synchronization status of the wireless device with respect to the network node; and
    adapting use of the preconfigured radio resources based on the synchronization status of the wireless device with respect to the network node.
2. The method of embodiment 1, wherein adapting use of the preconfigured radio resources based on the synchronization status of the wireless device with respect to the network node comprises, responsive to a determination that the synchronization status is unsynchronized, performing one or more of: refraining from utilizing the preconfigured radio resources to transmit to the network node; suspending use of the preconfigured radio resources to transmit to the network node; cancelling use of the preconfigured radio resources to transmit to the network node; delaying utilizing the preconfigured radio resources to transmit to the network node; and releasing the preconfigured radio resources.
3. The method of embodiment 1 or 2, further comprising: transmitting, to the network node, an information message comprising an indication of the adapted use of the preconfigured radio resources.
4. The method according to any preceding embodiment, wherein the wireless device is in an idle or inactive state when obtaining the synchronization status and adapting use of the preconfigured radio resources.
5. The method of any preceding embodiment, wherein the wireless device is in a connected state when receiving the configuration message from the network node.
6. The method of any preceding embodiment, wherein the preconfigured radio resources for uplink transmissions are for use in an idle or inactive state.
7. The method of any preceding embodiment, wherein obtaining the synchronization status of the wireless device with respect to the network node comprises obtaining the synchronization status of one or more of a transmitter and a receiver of the wireless device with respect to the network node.
8. The method of any preceding embodiment, wherein obtaining the synchronization status of the wireless device with respect to the network node comprises obtaining the synchronization status based on a radio activity level of the wireless device.
9. The method of embodiment 8, wherein the radio activity level of the wireless device comprises a service or application type utilized by the wireless device.
10. The method of embodiment 8 or 9, wherein the radio activity level of the wireless device comprises a discontinuous reception, DRX, configuration of the wireless device.
11. The method of embodiment 10, wherein the DRX configuration comprises a DRX cycle length.
12. The method of any of embodiments 8 to 11, wherein obtaining the synchronization status based on a radio activity level of the wireless device comprises mapping the radio activity level of the wireless device to a synchronization status of the wireless device.
13. The method of embodiment 12, wherein the radio activity level of the wireless device is mapped to a synchronization status of the wireless device based on a preconfigured or determined look-up table.
14. The method of embodiment 13, wherein the look-up table is determined by the wireless device based on historical statistics.
15. The method of any preceding embodiment, wherein obtaining the synchronization status of the wireless device with respect to the network node further comprises inferring the synchronization status of the wireless device with respect to the network node based on an amount of time elapsed since the wireless device was last synchronized with the network node.
16. The method of embodiment 15, wherein inferring the synchronization status of the wireless device with respect to the network node based on an amount of time elapsed since the wireless device was last synchronized with the network node comprises inferring the synchronization status of the wireless device with respect to the network node based on an amount of time elapsed since a preceding DRX on duration of the wireless device.
17. The method of embodiment 15 or 16, wherein inferring the synchronization status of the wireless device with respect to the network node based on an amount of time elapsed since the wireless device was last synchronized with the network node comprises comparing the amount of time elapsed since the wireless device was last synchronized with the network node to a threshold, and inferring the synchronization status of the wireless device with respect to the network node based on the comparison.
18. The method of embodiment 17, wherein the synchronization status of the wireless device with respect to the network node is inferred to be unsynchronized responsive to a determination that the amount of time exceeds the threshold.
19. The method of embodiment 17 or 18, wherein the threshold is determined based on the radio activity level of the wireless device.
20. The method of any preceding embodiment, wherein the preconfigured radio resources comprise one or more of: dedicated radio resources for the wireless device; contention-free shared radio resources; and contention-based shared radio resources.
21. The method of any preceding embodiment, wherein the preconfigured radio resources comprise periodic time resources.
22. The method of any preceding embodiment, wherein the preconfigured radio resources comprise a physical uplink data channel, such as PUSCH.
23. A method performed by a wireless device, the method comprising:
obtaining a synchronization status of the wireless device with respect to a network node; and
based on the synchronization status, adapting a procedure for requesting preconfigured radio resources from the network node for uplink transmission.
24. A method performed by a wireless device, the method comprising:
obtaining an amount of time required to synchronize with a network node; and
reporting the amount of time to the network node, enabling the network node to adapt its scheduling of preconfigured radio resources for the wireless device for uplink transmissions.
25. The method of any preceding embodiment, wherein the wireless device is a machine-type communication, MTC, or a narrowband Internet of things, NB-IOT) device.
26. The method of any of the previous embodiments, further comprising:
providing user data; and
forwarding the user data to a host computer via a transmission to the base station.

Group B Embodiments

27. A method performed by a base station, the method comprising:
responsive to receipt of a request from a wireless device for preconfigured radio resources for uplink transmissions, obtaining a synchronization status of the wireless device with respect to the base station;
based on the synchronization status, adapting preconfigured radio resources for the wireless device for uplink transmissions; and
causing transmission of a configuration message to the wireless device, the configuration message comprising an indication of the adapted preconfigured radio resources for the wireless device for uplink transmissions.
28. The method of embodiment 27, wherein adapting preconfigured radio resources comprises, responsive to a determination that the synchronization status is unsynchronized, performing one or more of: suspending the preconfigured radio resources; cancelling the preconfigured radio resources; delaying the preconfigured radio resources; releasing the preconfigured radio resources; and re-allocating the preconfigured radio resources to a second wireless device.
29. The method according to embodiment 27 or 28, wherein the preconfigured radio resources are for use when the wireless device is in an idle or inactive state.
30. The method of any of embodiments 27 to 29, wherein obtaining the synchronization status of the wireless device with respect to the base station comprises obtaining the synchronization status of one or more of a transmitter and a receiver of the wireless device with respect to the base station.
31. The method of any of embodiments 27 to 30, wherein obtaining the synchronization status of the wireless device with respect to the base station comprises obtaining the synchronization status based on a radio activity level of the wireless device.
32. The method of embodiment 31, wherein the radio activity level of the wireless device comprises a service or application type utilized by the wireless device.
33. The method of embodiment 31 or 32, wherein the radio activity level of the wireless device comprises a discontinuous reception, DRX, configuration of the wireless device.
34. The method of embodiment 33, wherein the DRX configuration comprises a DRX cycle length.
35. The method of any of embodiments 31 to 34, wherein obtaining the synchronization status based on a radio activity level of the wireless device comprises mapping the radio activity level of the wireless device to a synchronization status of the wireless device.
36. The method of embodiment 35, wherein the radio activity level of the wireless device is mapped to a synchronization status of the wireless device based on a look-up table.
37. The method of embodiment 36, wherein the look-up table is determined by the base station based on historical statistics.
38. The method of any of embodiments 27 to 37, wherein obtaining the synchronization status of the wireless device with respect to the base station further comprises inferring the synchronization status of the wireless device with respect to the base station based on an amount of time elapsed since the wireless device was last synchronized with the base station.
39. The method of embodiment 38, wherein inferring the synchronization status of the wireless device with respect to the base station based on an amount of time elapsed since the wireless device was last synchronized with the base station comprises inferring the synchronization status of the wireless device with respect to the base station based on an amount of time elapsed since a preceding DRX on duration of the wireless device.
40. The method of embodiment 38 or 39, wherein inferring the synchronization status of the wireless device with respect to the base station based on an amount of time elapsed since the wireless device was last synchronized with the base station comprises comparing the amount of time elapsed since the wireless device was last synchronized with the base station to a threshold, and inferring the synchronization status of the wireless device with respect to the base station based on the comparison.
41. The method of embodiment 40, wherein the synchronization status of the wireless device with respect to the base station is inferred to be unsynchronized responsive to a determination that the amount of time exceeds the threshold.

42. The method of embodiment 40 or 41, wherein the threshold is determined based on the radio activity level of the wireless device.
43. The method of any of embodiments 27 to 42, wherein the preconfigured radio resources comprise one or more of: dedicated radio resources for the wireless device; contention-free shared radio resources; and contention-based shared radio resources.
44. The method of any of embodiments 27 to 43, wherein the preconfigured radio resources comprise periodic time resources.
45. The method of any of embodiments 27 to 44, wherein the preconfigured radio resources comprise a physical uplink data channel, such as PUSCH.
46. A method performed by a base station, the method comprising:
   causing transmission of a configuration message to a first wireless device, the configuration message comprising an indication of preconfigured radio resources for the first wireless device for uplink transmissions;
   obtaining a synchronization status of the first wireless device with respect to the base station; and
   based on the synchronization status, re-allocating the preconfigured radio resources to a second wireless device.
47. A method performed by a base station, the method comprising:
   responsive to receipt, from a wireless device, of a report message comprising an indication of an amount of time taken for the wireless device to synchronize with the base station, adapting preconfigured radio resources for the wireless device for uplink transmissions based on the indicated amount of time; and
   causing transmission of a configuration message to the wireless device, the configuration message comprising an indication of the adapted preconfigured radio resources for the wireless device for uplink transmissions to the base station.
48. The method of any of embodiments 27 to 47, wherein the wireless device or the first wireless device is a machine-type communication, MTC, or a narrowband Internet of things, NB-IOT) device.
49. The method of any of the previous embodiments, further comprising:
   obtaining user data; and
   forwarding the user data to a host computer or a wireless device.

Group C Embodiments

50. A wireless device, the wireless device comprising:
   processing circuitry configured to perform any of the steps of any of the Group A embodiments; and
   power supply circuitry configured to supply power to the wireless device.
51. A base station, the base station comprising:
   processing circuitry configured to perform any of the steps of any of the Group B embodiments;
   power supply circuitry configured to supply power to the base station.
52. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
53. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.
54. The communication system of the previous embodiment further including the base station.
55. The communication system of the previous 2 embodiments, further including the UE, wherein the UE is configured to communicate with the base station.
56. The communication system of the previous 3 embodiments, wherein:
   the processing circuitry of the host computer is configured to execute a host application, thereby providing the user data; and
   the UE comprises processing circuitry configured to execute a client application associated with the host application.
57. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.
58. The method of the previous embodiment, further comprising, at the base station, transmitting the user data.
59. The method of the previous 2 embodiments, wherein the user data is provided at the host computer by executing a host application, the method further comprising, at the UE, executing a client application associated with the host application.
60. A user equipment (UE) configured to communicate with a base station, the UE comprising a radio interface and processing circuitry configured to performs the of the previous 3 embodiments.
61. A communication system including a host computer comprising:
   processing circuitry configured to provide user data; and a communication interface configured to forward user data to a cellular network for transmission to a user equipment (UE),
wherein the UE comprises a radio interface and processing circuitry, the UE's components configured to perform any of the steps of any of the Group A embodiments.

62. The communication system of the previous embodiment, wherein the cellular network further includes a base station configured to communicate with the UE.

63. The communication system of the previous 2 embodiments, wherein:
the processing circuitry of the host computer is configured to execute a host application, thereby providing the user data; and
the UE's processing circuitry is configured to execute a client application associated with the host application.

64. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

65. The method of the previous embodiment, further comprising at the UE, receiving the user data from the base station.

66. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

67. The communication system of the previous embodiment, further including the UE.

68. The communication system of the previous 2 embodiments, further including the base station, wherein the base station comprises a radio interface configured to communicate with the UE and a communication interface configured to forward to the host computer the user data carried by a transmission from the UE to the base station.

69. The communication system of the previous 3 embodiments, wherein:
the processing circuitry of the host computer is configured to execute a host application; and
the UE's processing circuitry is configured to execute a client application associated with the host application, thereby providing the user data.

70. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

71. A method implemented in a communication system including a host computer, a base station and a user equipment (UE), the method comprising:
at the host computer, receiving user data transmitted to the base station from the UE, wherein the UE performs any of the steps of any of the Group A embodiments.

72. The method of the previous embodiment, further comprising, at the UE, providing the user data to the base station.

73. The method of the previous 2 embodiments, further comprising:
at the UE, executing a client application, thereby providing the user data to be transmitted; and
at the host computer, executing a host application associated with the client application.

74. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

75. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

76. The communication system of the previous embodiment further including the base station.

77. The communication system of the previous 2 embodiments, further including the UE, wherein the UE is configured to communicate with the base station.

78. The communication system of the previous 3 embodiments, wherein:
the processing circuitry of the host computer is configured to execute a host application;
the UE is configured to execute a client application associated with the host application, thereby providing the user data to be received by the host computer.

79. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

80. The method of the previous embodiment, further comprising at the base station, receiving the user data from the UE.

81. The method of the previous 2 embodiments, further comprising at the base station, initiating a transmission of the received user data to the host computer.

The invention claimed is:

1. A method performed by a wireless device, the method comprising:
receiving, from a network node, a configuration message comprising an indication of preconfigured radio resources for uplink transmissions;
obtaining a synchronization status of the wireless device with respect to the network node; and
adapting use of the preconfigured radio resources based on the synchronization status of the wireless device with respect to the network node, wherein adapting use of the preconfigured radio resources based on the synchronization status of the wireless device with respect to the network node comprises, responsive to a determination that the synchronization status is unsynchronized and while maintaining the preconfigured radio resources, performing one or more of: refraining from utilizing the preconfigured radio resources to transmit to the network node; suspending use of the preconfigured radio resources to transmit to the network node; cancelling use of the preconfigured radio resources to transmit to the network node; and delaying utilizing the preconfigured radio resources to transmit to the network node.

2. The method of claim 1, further comprising:
transmitting, to the network node, an information message comprising an indication of the adapted use of the preconfigured radio resources.

3. The method of claim 1, wherein obtaining the synchronization status of the wireless device with respect to the network node comprises obtaining the synchronization status of one or more of a transmitter and a receiver of the wireless device with respect to the network node.

4. The method of claim 1, wherein obtaining the synchronization status of one or more of a transmitter and a receiver of the wireless device comprises obtaining the synchronization status based on one or more of frequency drift and timing drift in one or more of the receiver and the transmitter.

5. The method of claim 1, wherein obtaining the synchronization status of the wireless device with respect to the network node comprises obtaining the synchronization status based on a radio activity level of the wireless device.

6. The method of claim 5, wherein the radio activity level of the wireless device comprises a service or application type utilized by the wireless device.

7. The method of claim 5, wherein the radio activity level of the wireless device comprises a discontinuous reception, DRX, configuration of the wireless device.

8. The method of claim 7, wherein the DRX configuration comprises one or more of a DRX cycle length, an extended DRX cycle length, and a paging time window, PTW.

9. The method of claim 5, wherein obtaining the synchronization status based on a radio activity level of the wireless device comprises mapping the radio activity level of the wireless device to a synchronization status of the wireless device.

10. The method of claim 1, wherein obtaining the synchronization status of the wireless device with respect to the network node further comprises inferring the synchronization status of the wireless device with respect to the network node based on an amount of time elapsed since the wireless device was last synchronized with the network node.

11. The method of claim 10, wherein inferring the synchronization status of the wireless device with respect to the network node based on an amount of time elapsed since the wireless device was last synchronized with the network node comprises inferring the synchronization status of the wireless device with respect to the network node based on an amount of time elapsed since a preceding DRX on duration of the wireless device.

12. The method of claim 10, wherein inferring the synchronization status of the wireless device with respect to the network node based on an amount of time elapsed since the wireless device was last synchronized with the network node comprises comparing the amount of time elapsed since the wireless device was last synchronized with the network node to a threshold, and inferring the synchronization status of the wireless device with respect to the network node based on the comparison.

13. The method of claim 12, wherein the threshold is determined based on the radio activity level of the wireless device.

14. A method performed by a base station, the method comprising:
responsive to receipt of a request from a wireless device for preconfigured radio resources for uplink transmissions, obtaining a synchronization status of the wireless device with respect to the base station;
based on the synchronization status, adapting preconfigured radio resources for the wireless device for uplink transmissions; and
causing transmission of a configuration message to the wireless device, the configuration message comprising an indication of the adapted preconfigured radio resources for the wireless device for uplink transmissions,
wherein adapting the preconfigured radio resources based on the synchronization status, responsive to a determination that the synchronization status is unsynchronized and while maintaining the preconfigured radio resources, performing one or more of: suspending the preconfigured radio resources; cancelling the preconfigured radio resources; and delaying the preconfigured radio resources.

15. The method according to claim 14, wherein the preconfigured radio resources are for use when the wireless device is in an idle or inactive state.

16. The method of claim 14, wherein obtaining the synchronization status of the wireless device with respect to the base station comprises obtaining the synchronization status of one or more of a transmitter and a receiver of the wireless device with respect to the base station.

17. The method of claim 14, wherein obtaining the synchronization status of the wireless device with respect to the base station comprises obtaining the synchronization status based on a radio activity level of the wireless device.

18. The method of claim 17, wherein the radio activity level of the wireless device comprises a service or application type utilized by the wireless device.

19. The method of claim 17, wherein the radio activity level of the wireless device comprises a discontinuous reception, DRX, configuration of the wireless device.

20. The method of claim 19, wherein the DRX configuration comprises a DRX cycle length.

21. The method of any of claim 17, wherein obtaining the synchronization status based on a radio activity level of the wireless device comprises mapping the radio activity level of the wireless device to a synchronization status of the wireless device.

22. The method of claim 14, wherein obtaining the synchronization status of the wireless device with respect to the base station further comprises inferring the synchronization status of the wireless device with respect to the base station based on an amount of time elapsed since the wireless device was last synchronized with the base station.

23. The method of claim 22, wherein inferring the synchronization status of the wireless device with respect to the base station based on an amount of time elapsed since the wireless device was last synchronized with the base station comprises inferring the synchronization status of the wireless device with respect to the base station based on an amount of time elapsed since a preceding DRX on duration of the wireless device.

24. The method of claim 22, wherein inferring the synchronization status of the wireless device with respect to the base station based on an amount of time elapsed since the wireless device was last synchronized with the base station comprises comparing the amount of time elapsed since the wireless device was last synchronized with the base station to a threshold, and inferring the synchronization status of the wireless device with respect to the base station based on the comparison.

25. The method of claim 24, wherein the threshold is determined based on the radio activity level of the wireless device.

26. A wireless device, the wireless device comprising:
processing circuitry configured to cause the wireless device to:
receive, from a network node, a configuration message comprising an indication of preconfigured radio resources for uplink transmissions;
obtain a synchronization status of the wireless device with respect to the network node; and
adapt use of the preconfigured radio resources based on the synchronization status of the wireless device with respect to the network node; and
power supply circuitry configured to supply power to the wireless device, wherein
the processing circuitry is further configured to, responsive to a determination that the synchronization status is unsynchronized and while maintaining the preconfigured radio resources, perform one or more of: refrain from utilizing the preconfigured radio resources to transmit to the network node; suspend use of the preconfigured radio resources to transmit to the network node; cancel use of the preconfigured radio resources to transmit to the network node; and delay utilizing the preconfigured radio resources to transmit to the network node.

27. A base station, the base station comprising:
processing circuitry configured to cause the base station to:
responsive to receipt of a request from a wireless device for preconfigured radio resources for uplink transmissions, obtain a synchronization status of the wireless device with respect to the base station;
based on the synchronization status, adapt preconfigured radio resources for the wireless device for uplink transmissions; and
cause transmission of a configuration message to the wireless device, the configuration message comprising an indication of the adapted preconfigured radio resources for the wireless device for uplink transmissions; and
power supply circuitry configured to supply power to the base station, wherein
the processing circuitry is further configured to, responsive to a determination that the synchronization status is unsynchronized and while maintaining the preconfigured radio resources, perform one or more of: suspend the preconfigured radio resources; cancel the preconfigured radio resources; and delay the preconfigured radio resources.

28. A method performed by a wireless device, the method comprising:
receiving, from a network node, a configuration message comprising an indication of preconfigured radio resources for uplink transmissions;
obtaining a synchronization status of the wireless device with respect to the network node; and
adapting use of the preconfigured radio resources based on the synchronization status of the wireless device with respect to the network node, wherein
obtaining the synchronization status of the wireless device with respect to the network node further comprises inferring the synchronization status of the wireless device with respect to the network node based on an amount of time elapsed since the wireless device was last synchronized with the network node.

* * * * *